US012478898B2

(12) United States Patent
Townsend et al.

(10) Patent No.: US 12,478,898 B2
(45) Date of Patent: Nov. 25, 2025

(54) PREPARATIVE CHROMATOGRAPHY SYSTEM AND METHOD FOR CHROMATOGRAPHY SEPARATIONS

(71) Applicant: Puridify Ltd, Stevenage (SE)

(72) Inventors: Matthew Townsend, Stevenage (GB); Ian Scanlon, Stevenage (GB); Ola Lind, Uppsala (SE); Gunnar Malmquist, Uppsala (GB)

(73) Assignee: CYTIVA BIOPROCESS R&D AB, Uppsala (SE)

( * ) Notice: Subject to any disclaimer, the term of this patent is extended or adjusted under 35 U.S.C. 154(b) by 505 days.

(21) Appl. No.: 17/996,777

(22) PCT Filed: Apr. 27, 2021

(86) PCT No.: PCT/EP2021/060942
§ 371 (c)(1),
(2) Date: Oct. 20, 2022

(87) PCT Pub. No.: WO2021/219611
PCT Pub. Date: Nov. 4, 2021

(65) Prior Publication Data
US 2023/0173407 A1 Jun. 8, 2023

(30) Foreign Application Priority Data
Apr. 29, 2020 (GB) .................................... 2006310

(51) Int. Cl.
*B01D 15/24* (2006.01)
*B01D 15/18* (2006.01)
(Continued)

(52) U.S. Cl.
CPC ....... *B01D 15/1885* (2013.01); *B01D 15/203* (2013.01); *B01D 15/247* (2013.01); *B01D 15/424* (2013.01)

(58) Field of Classification Search
CPC .............. B01D 15/1885; B01D 15/203; B01D 15/247; B01D 15/424; B01D 15/12;
(Continued)

(56) References Cited

U.S. PATENT DOCUMENTS

| 6,427,526 B1 | 8/2002 | Davison |
| 2002/0011437 A1 | 1/2002 | Kaito |

(Continued)

FOREIGN PATENT DOCUMENTS

| CN | 103221105 A | 7/2013 |
| EP | 3043178 A1 | 7/2016 |

(Continued)

OTHER PUBLICATIONS

International Search Report and Written Opinion Issued in International Patent Application No. PCT/EP2021/060942, mailed Sep. 30, 2021 (23 pages).

(Continued)

*Primary Examiner* — Hayden Brewster
(74) *Attorney, Agent, or Firm* — Eversheds-Sutherland (US) LLP

(57) ABSTRACT

The present invention relates to a preparative chromatography system (200, 500, 800) and a chromatography process (400, 700) adapted to repetitive cycling of chromatography volumes. The system (200, 500, 800) comprises at least two upstream pumps (203a, 803a, 203b, 803b) and separate flow paths (220) from process liquid sources to the chromatography device (200, 500, 800). The system (200, 500, 800) is arranged to prime one flow path (220) with one process liquid while providing another process liquid to the chromatography device and thereby minimizing the hold-up volume of the system (200, 500, 800).

22 Claims, 23 Drawing Sheets

(51) Int. Cl.
   *B01D 15/20* (2006.01)
   *B01D 15/42* (2006.01)
(58) Field of Classification Search
   CPC ............... B01D 15/18; G01N 35/1097; G01N 2030/527; G01N 30/38; G01N 30/34; G01N 30/466; G01N 2030/8804
   See application file for complete search history.

(56) References Cited

U.S. PATENT DOCUMENTS

| | | |
|---|---|---|
| 2006/0127284 A1 | 6/2006 | Mallet |
| 2007/0144977 A1 | 6/2007 | Kitagawa |
| 2009/0205409 A1 | 8/2009 | Ciavarini |
| 2010/0276350 A1 | 11/2010 | Kono et al. |
| 2014/0251913 A1 | 9/2014 | Lacki et al. |
| 2016/0202218 A1 | 7/2016 | Owa |
| 2016/0347823 A1 | 12/2016 | Bergmann |
| 2019/0247769 A1 | 8/2019 | Massingill |
| 2019/0276491 A1 | 9/2019 | Bracewell |
| 2019/0302065 A1 | 10/2019 | Yamazaki |

FOREIGN PATENT DOCUMENTS

| | | |
|---|---|---|
| JP | 2006527370 A | 11/2006 |
| JP | 2010271300 A | 12/2010 |
| JP | 2011214837 A | 10/2011 |
| JP | 2012026893 A | 2/2012 |
| WO | 2019001778 A1 | 1/2019 |
| WO | 2020173862 A1 | 9/2020 |

OTHER PUBLICATIONS

Combined Search and Examination Report Issued in GB Patent Application No. GB2006310.3, mailed Oct. 22, 2020 (4 pages).
Roper D K et al: "Separation of biomolecules using adsorptive membranes", Journal of Chromatography A, Elsevier, Amsterdam, NL, vol. 702, No. 1, May 19, 1995 (May 19, 1995), pp. 3-26.
Japanese Office Action in corresponding JP Application No. 2022-566239, dated Dec. 23, 2025, 15 pages.
Chinese Search Report and Office Action Issued in corresponding Chinese Application No. 202180038865.5, mailed Jun. 21, 2024 (24 pages).

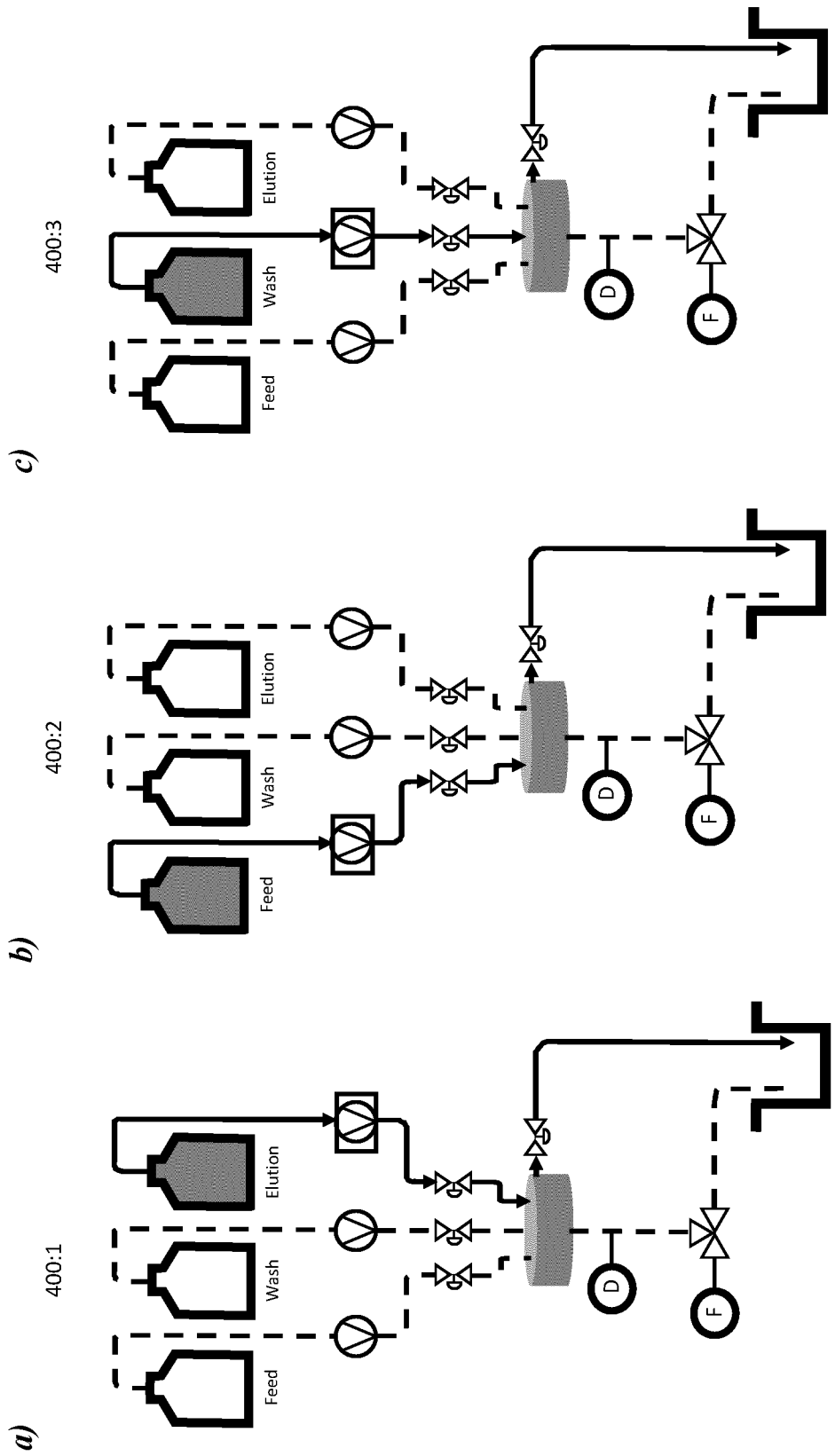
Fig. 3a-c

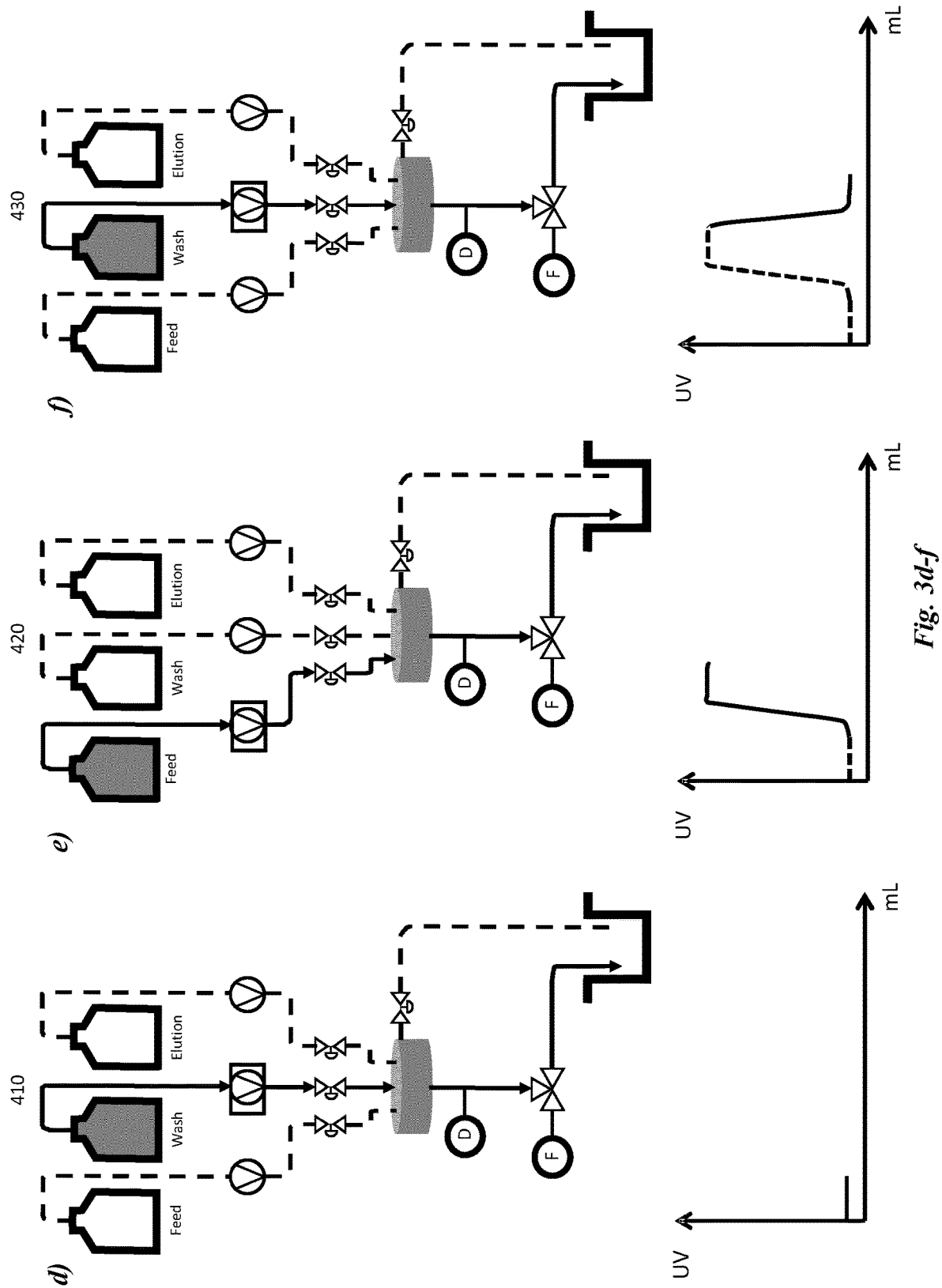
Fig. 3d-f

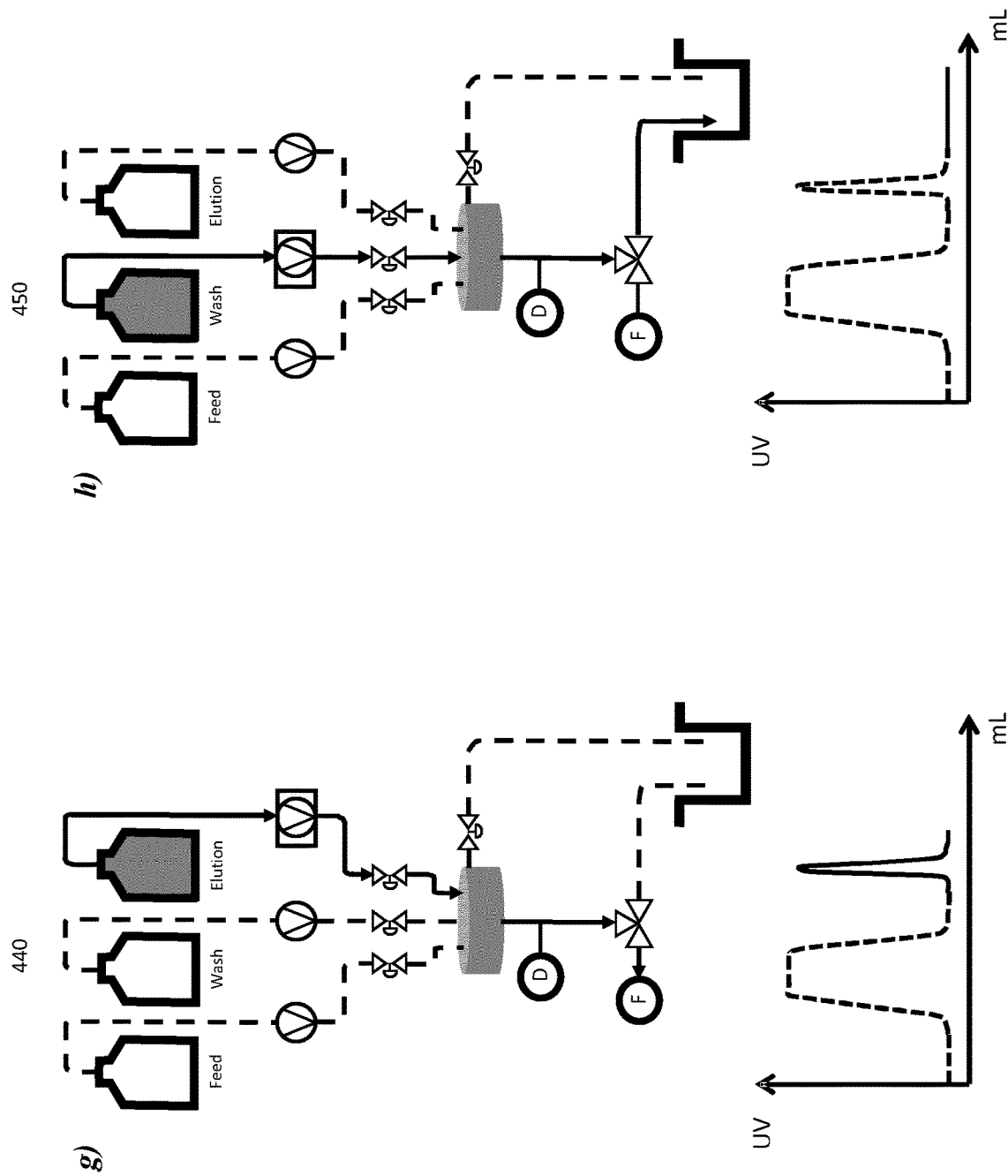
Fig. 3g-h

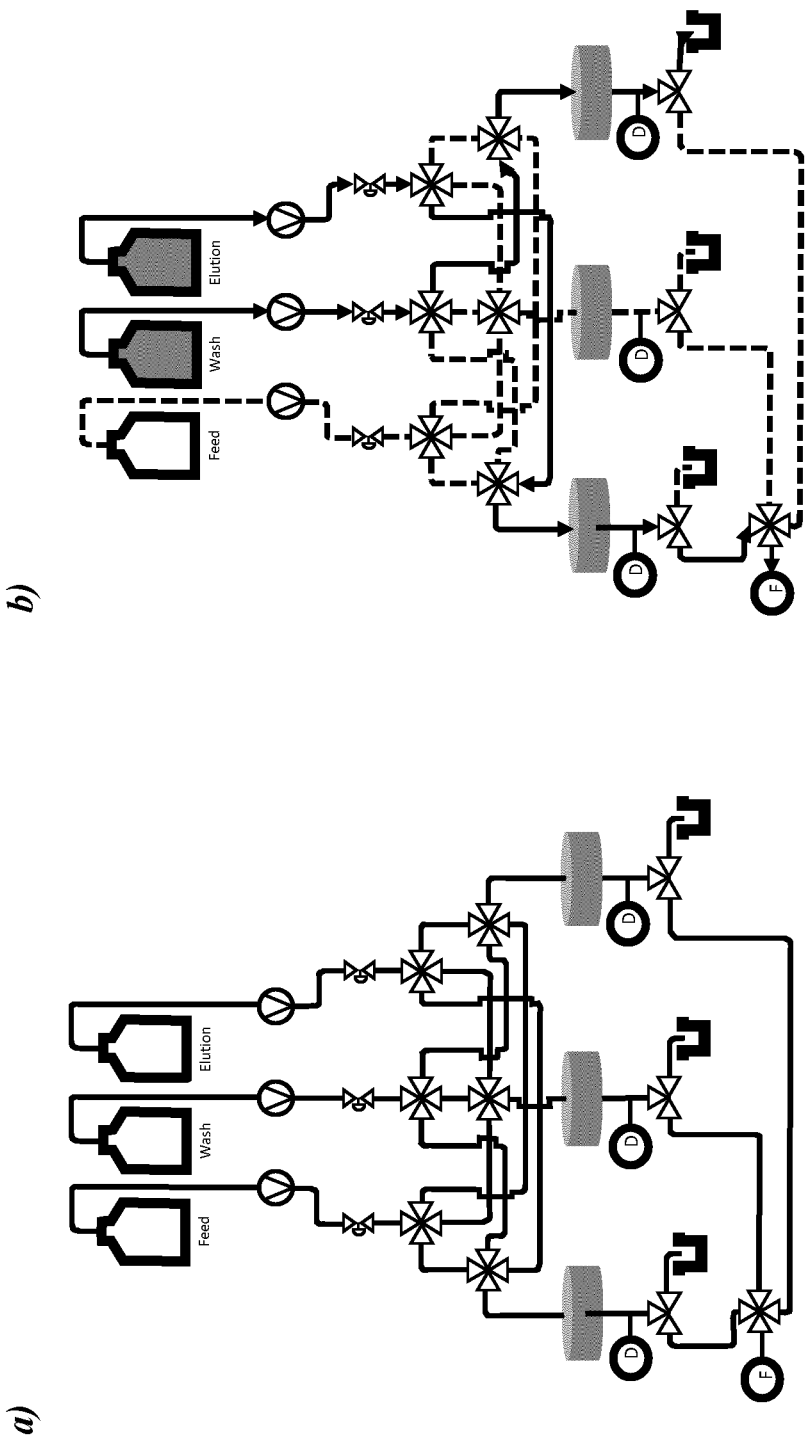
*Fig. 6a-b*

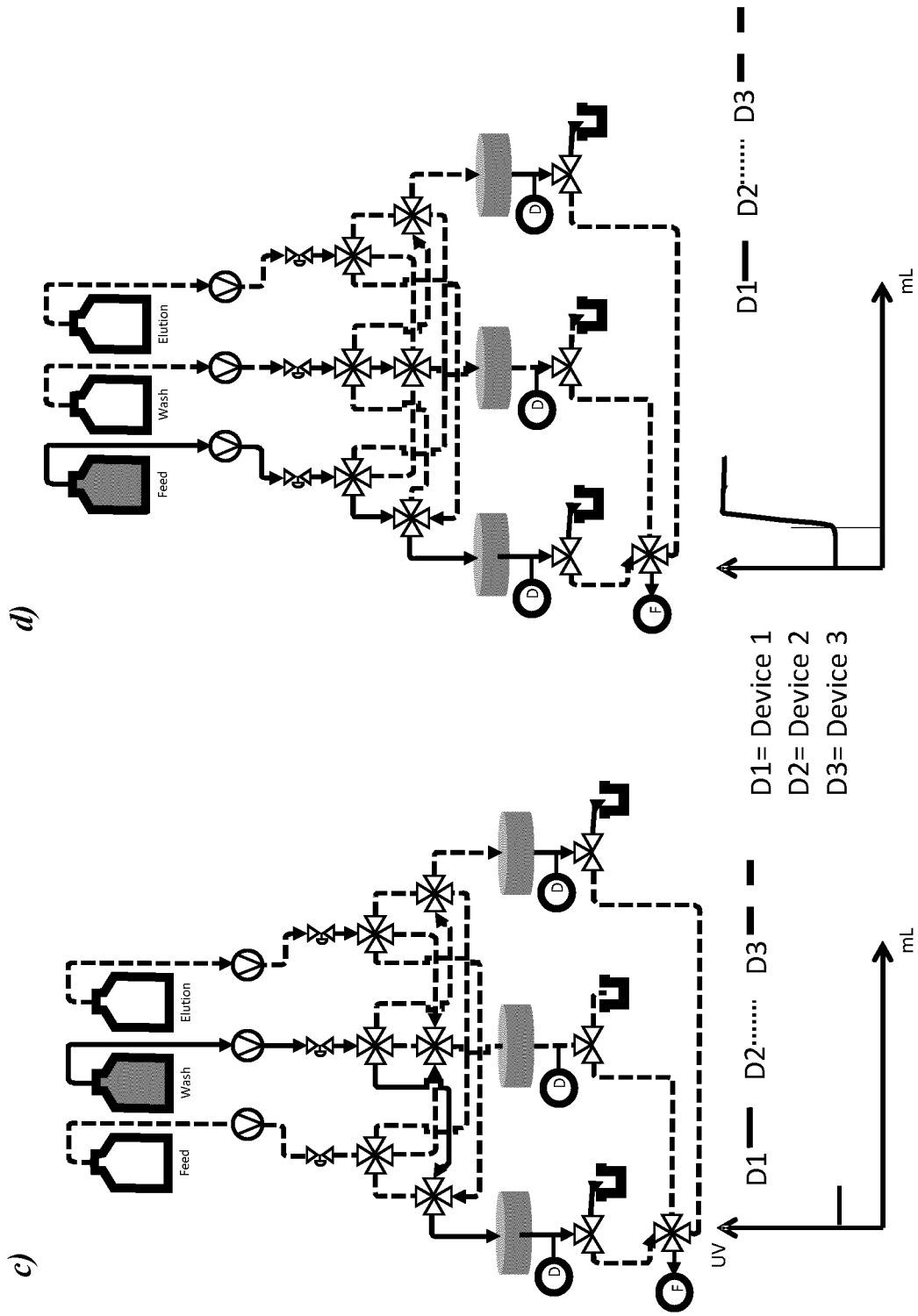
Fig. 6c-d

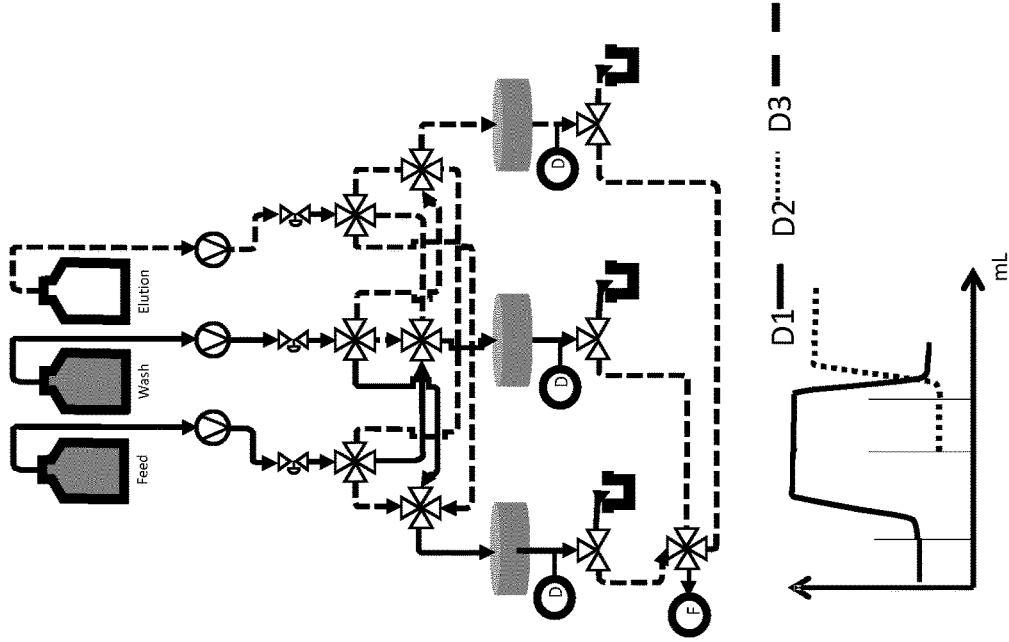
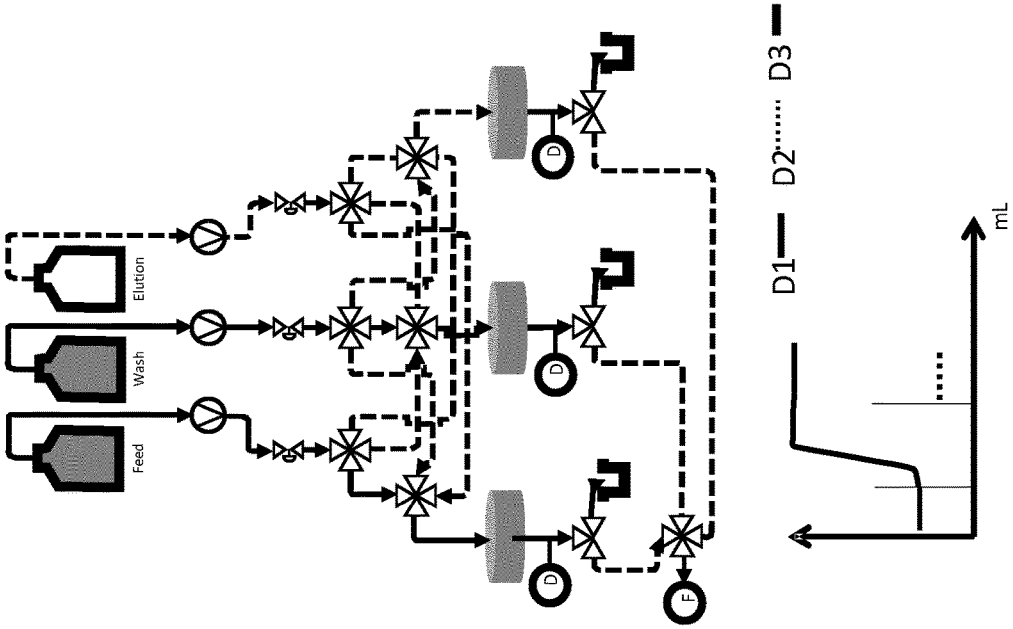
*Fig. 6e-f*

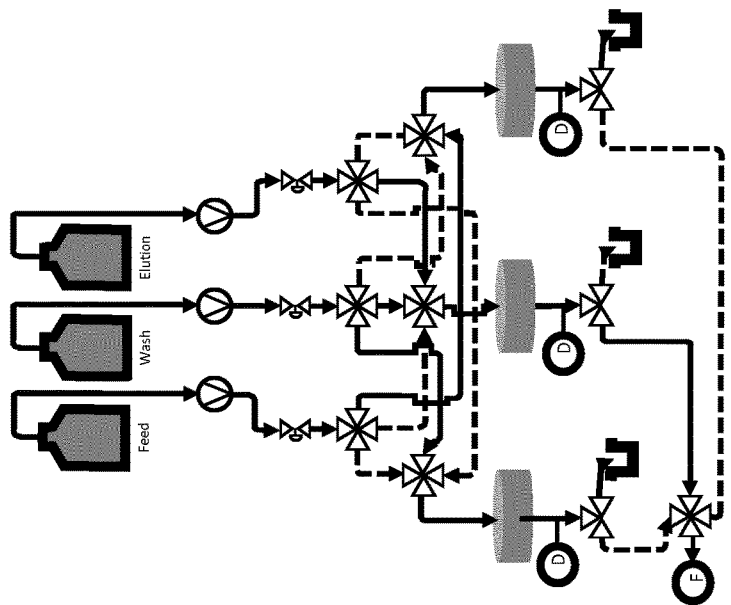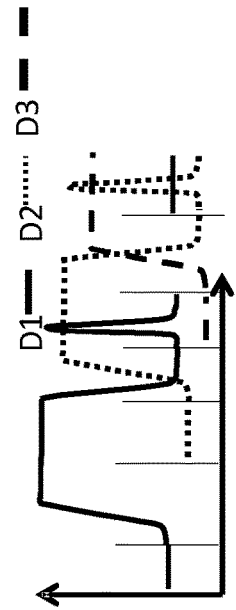
*h)*
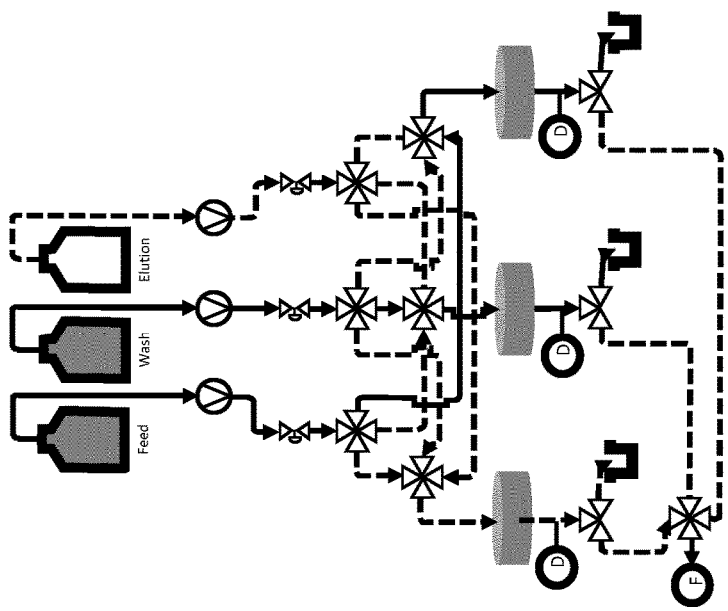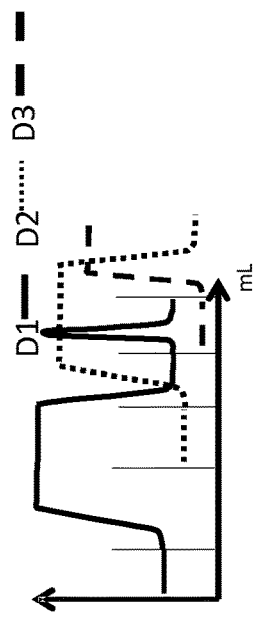
*i)*
*Fig. 6h-i*

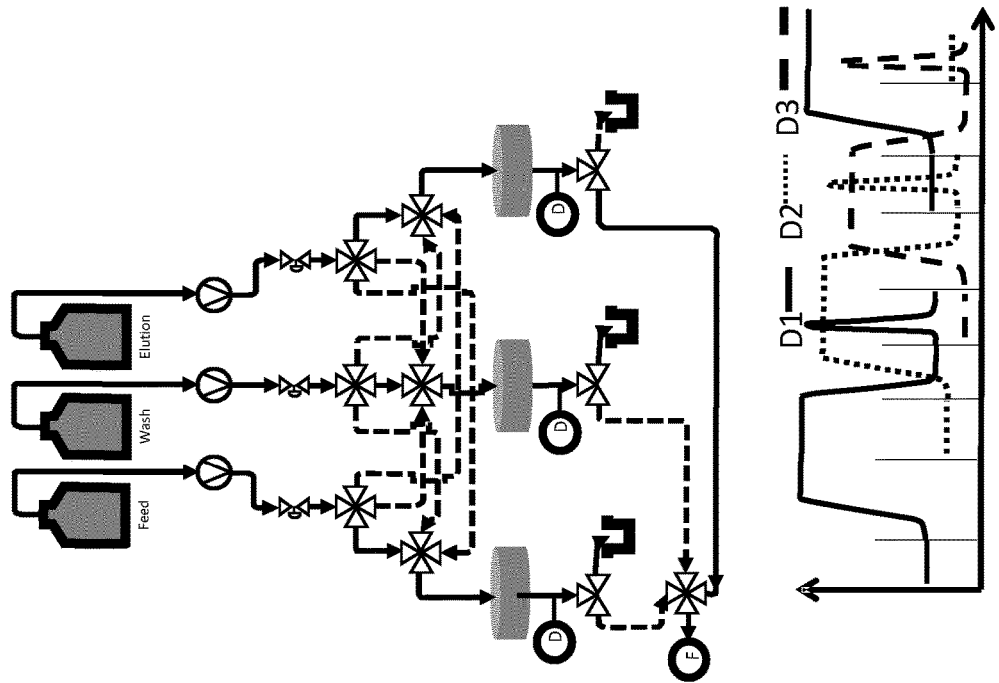
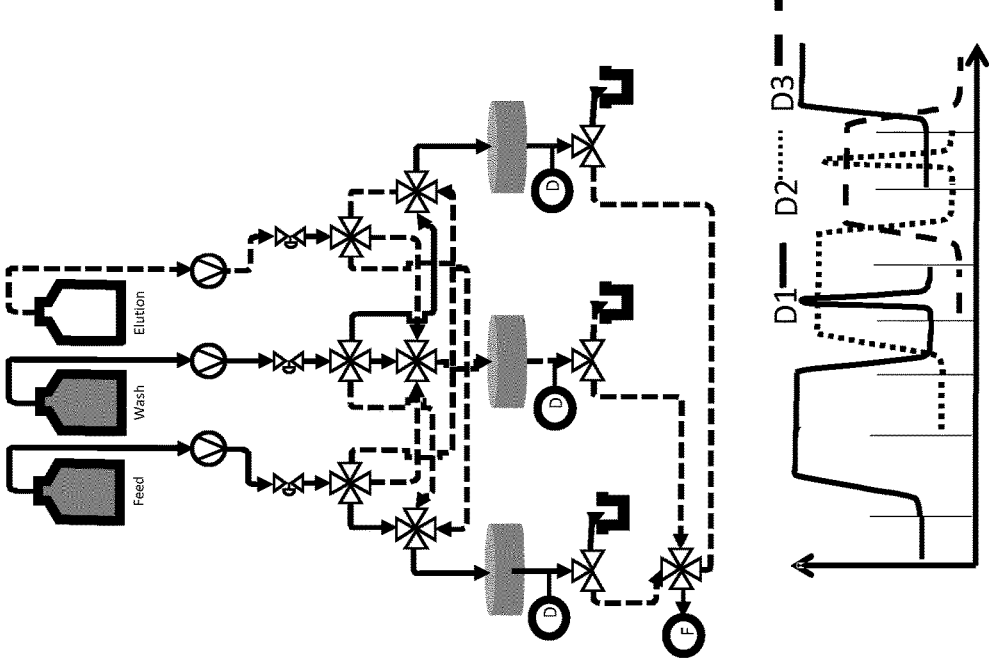
*Fig. 6j-k*

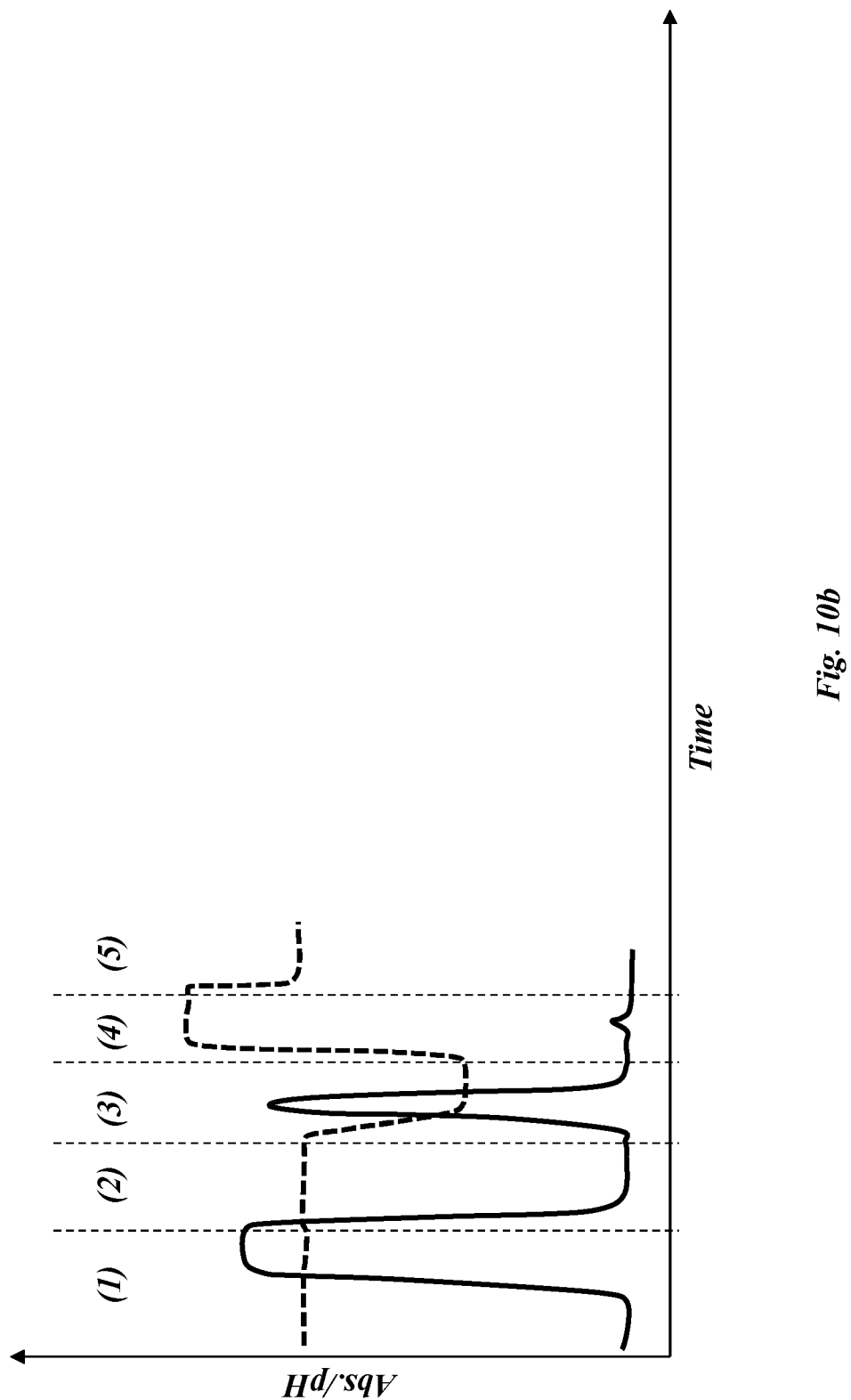

PREPARATIVE CHROMATOGRAPHY SYSTEM AND METHOD FOR CHROMATOGRAPHY SEPARATIONS

CROSS REFERENCE TO RELATED APPLICATIONS

This application claims the priority benefit of PCT/EP2021/060942, filed Apr. 27, 2021, which claims the priority benefit to GB Application No. 2006310.3, filed Apr. 29, 2020, the entire contents of which are incorporated herein by reference.

FIELD OF THE INVENTION

The present invention relates to a preparative chromatography system and method of operating a preparative chromatography system and a chromatography process adapted to repetitive cycling of chromatography volumes. In particular, the invention relates to a system and method optimized for chromatography device of comparably small volumes, typically membrane chromatography devices.

BACKGROUND OF THE INVENTION

Chromatography is today the dominant industrial scale method to provide high purity substances, in particular high purity proteins, in the pharmaceutical area. Historically, separation and purification has been achieved primarily with conventional packed bed chromatography utilizing columns of porous beads. The porous bead-based systems have well known shortcomings with regards to high flowrate, which is desirable for having a high system throughput, the shortcomings attributed to the separation process being diffusion-limited. To address, at least partly, these problems alternatives to the conventional porous bead-based systems have been introduced and developed during the past decade. These alternative techniques include using monoliths and membrane. The flow through such systems are typically convective rather than diffusional, which make them less sensitive to flow than porous bead-based systems and may be run at considerably higher flow rates. However, until recently the binding capacity of the membrane-based systems have been a limiting factor. With the introduction of fiber based as a chromatography medium the drawback of the previous membrane-based systems is significantly reduced. WO2018/011600 discloses a polymer fiber based chromatography medium. Such a document, and all other references made herein (whether or not made to written disclosures, products, etc.) are hereby incorporated by reference to the maximum permissible extent allowed.

All chromatography systems exhibit "dead volume" defined as the extra volume experienced by solutes as they pass through the chromatographic system, especially any non-swept volume exposed to the mobile phase flow. The term "dead volume" has been used in different, and not always correct ways, and is considered as an obsolete term. The related term "hold-up volume" is established as a better-defined alternative and is equal to the retention volume of an unretained compound and is in most cases the most relevant parameter to consider. The hold-up volume includes any volumes contributed by the sample injector, the detector, pumps, valves, tubing, connectors etc. Large hold-up volumes compared to the volume of the chromatography device results in bad peak resolution and also in increased waste of buffers and feed.

Control of the hold-up volume has been a concern in the design of chromatography systems and has generally been regarded as something that is taken care of by careful, but not excessively complicated design choices. However, with the emerge of the novel chromatography medias such as fibers, the volume of the active component, here referred to as the chromatography device is very much smaller than the volume of the column/cartridge in conventional porous bead-based systems. As a result the volume of the chromatography device is in the same order and in some cases even smaller, than the volume of the tubing, valves, pumps etc transporting the feed and buffers to the chromatography device. In these novel chromatography systems the hold-up volume has emerged as a critical factor. In addition, in preparative chromatography systems, wherein the advantages of the novel separation techniques are best utilized, the process is cycled a large number of times, making the adverse effects of the now comparably large hold-up volume even more pronounced. The previous deign principles and general care in choosing for example tubing, is not sufficient with the novel small chromatography devices. It is therefore a need for a high flow preparative chromatography system that can handle high flow rates with low hold-up volume.

SUMMARY OF THE INVENTION

The object of the invention is to provide a preparative chromatography system and method of operation that overcomes the drawbacks of prior art preparative chromatography systems.

This is achieved by the method of operating a preparative chromatography system as defined in claim 1, and the preparative chromatography system as defined in claim 13.

According to one aspect of the invention a method for performing preparative chromatography operating a preparative chromatography system is provided. The preparative chromatography system is arranged to operate with at least a first process liquid and a second process liquid and the preparative chromatography system comprising at least one chromatography device, a first process liquid source and a second process liquid source, and providing a first upper flow path from the first process liquid source to the chromatography device, a second upper flow path from the second process liquid source to the chromatography device, and a first pump provided in the first upper flow path and arranged to provide the first process liquid to the chromatography device, a second pump provided in the second upper flow path and arranged to provide the second process liquid to the chromatography device, and wherein the first upper flow path is joined with the second upper flow path at a mixing point, the mixing point being downstream of the first and second pump and upstream of the chromatography device, the method comprising:

a step of engaging the first pump to prime the first upper flow path with the first process liquid, and a step, taken after the priming, of engaging the first pump to provide the first process liquid to the chromatography device; and a step of engaging the second pump to prime the second upper flow path with the second process liquid, and a step, taken after the priming, of engaging the second pump to provide the second process liquid to the chromatography device.

According to one embodiment of the invention the preparative chromatography system is arranged to operate with at least three process liquids, feed liquid, wash liquid and eluent liquid, and the preparative chromatography system comprises a feed source, a the wash source and an eluent source, and providing an upper feed flow path from the feed source to the chromatography device, an upper wash flow path from the wash source to the chromatography device and an upper eluent flow path from the eluent source to the chromatography device, and the method comprises a pre-phase with the steps of:
  priming the upper feed flow path with feed liquid provided from the feed source;
  priming the upper wash flow path with wash liquid provided from the wash source; and
  priming the upper eluent flow path with eluent liquid provided from a eluent source; and
wherein the method comprises an active preparative phase comprising a process cycle with the steps of:
  equilibrating the chromatography device by providing wash liquid from the wash source to the chromatography device via the upper wash flow path;
  loading feed liquid to the chromatography device by providing feed liquid from the wash source to the chromatography device via the upper feed flow path;
  washing the chromatography device by providing wash liquid from the wash source to the chromatography device via the upper wash flow path;
  performing elution in the chromatography device by providing eluent liquid provided from the eluent source to the chromatography device via the upper eluent flow path; and
  re-equilibrating the chromatography device by providing wash liquid from the wash source to the chromatography device via the upper wash flow path.

According to one embodiment of the invention the preparative chromatography system is arranged to operate with at least three process liquids, feed liquid, wash liquid and eluent liquid, and the preparative chromatography system comprises:
  a feed source connected to a feed pump, a the wash source connected to wash pump and an eluent source connected to eluent pump;
  a first chromatography device in connection with a first monitoring unit, a second chromatography device in connection with a second monitoring unit and a third chromatography device in connection with a third monitoring unit;
  a first upper feed flow path provided from the feed source to the first chromatography device, a second upper feed flow path provided from the feed source to the second chromatography device and a third upper feed flow path provided from the feed source to the third chromatography device, wherein the upper feed flow paths are bifurcated downstream of the feed pump;
  a first upper wash flow path provided from the wash source to the first chromatography device, a second upper wash flow path provided from the wash source to the second chromatography device and a third upper wash flow path provided from the wash source to the third chromatography device, wherein the upper wash flow paths are bifurcated downstream of the wash pump;
  a first upper eluent flow path provided from the eluent source to the first chromatography device, a second upper eluent flow path provided from the eluent source to the second chromatography device and a third upper eluent flow path provided from the eluent source to the third chromatography device, wherein the upper eluent flow paths are bifurcated downstream of the eluent pump;

And wherein the method comprises an active preparative phase comprising the steps at least partly simultaneously performed, of:
  equilibrating or washing one of the first, second or third chromatography devices with wash liquid provided from the wash source via one of first upper wash flow paths by engaging the wash pump,
  loading another of the first, second or third chromatography devices with feed liquid provided from the feed source via one of the upper feed flow paths by engaging the feed pump; and
  performing eluation in the remaining of the first, second or third chromatography devices by providing eluent liquid from the eluent source via the one of the upper eluent flow path by engaging the eluent pump, and wherein the eluate is directed to a waste container or to the fraction collector, depending on the content of eluate detected by the monitoring unit.

According to one embodiment of the invention the preparative chromatography system is arranged to operate with at least three process liquids, feed liquid, wash liquid and eluent liquid, and wherein the preparative chromatography system comprises: a feed source, a wash source and an eluent source; a first pump, a second pump, a first waste container and a common valve connected to the chromatography device, and wherein the preparative chromatography system provides first chromatography flow paths which pass the first pump from at least one of the process liquid sources to the common valve, and second chromatography flow paths which pass the second pump from at least one of the process liquid sources to the common valve; first waste flow paths which pass the first pump from at least one of the process liquid sources to the first waste container, and second waste flow paths which pass the second pump from least one of the process liquid sources to the common valve; and wherein, in the steps of the method:
while the first pump is engaged in providing a process liquid to the chromatography device, the second pump is at least partly simultaneously engaged in providing a process liquid to the waste container via one of the second waste flow paths.

According to one embodiment of the invention the preparative chromatography system is comprises an upper monitoring unit arranged prior in the flow direction to the first waste container, and the upper monitoring unit arranged to analyze the contents in the first waste flow paths and the second waste flow paths, and wherein in the steps of the method, the duration of at least one of the priming operations is determined based on the output of the measuring unit.

According to one aspect of the invention a preparative chromatography system is provided. The preparative chromatography system is arranged to operate with at least a first process liquid and a second process liquid and the preparative chromatography system comprising at least one chromatography device, a first process liquid source and a second process liquid source, and providing a first upper flow path from the first process liquid source to the chromatography device, a second upper flow path from the second process liquid source to the chromatography device, and a first pump provided in the first upper flow path and arranged to provide the first process liquid to the chromatography device, a second pump provided in the second upper flow path and arranged to provide the second process liquid to the chromatography device, and wherein the first upper flow path is joined with the second upper flow path at a mixing point, the mixing point being downstream of the first and second pump and upstream of the chromatography device. The system is arranged to:

in a step of priming the first upper flow path with the first process liquid engaging the first pump, and in a step, taken after the priming, engaging the first pump to provide the first process liquid to the chromatography device; and in a step of priming the second upper flow path with the second process liquid engaging the second pump, and in a step, taken after the priming, engaging the second pump (203b, 803b) to provide the second process liquid to the chromatography device (205, 805).

According to one embodiment the preparative chromatography system is arranged to operate with at least three process liquids, feed liquid, wash liquid and eluent liquid, and the preparative chromatography system comprises a feed source, a the wash source and an eluent source, and providing an upper feed flow path from the feed source to the chromatography device, an upper wash flow path from the wash source to the chromatography device and an upper eluent flow path from the eluent source to the chromatography device, and the preparative chromatography system arranged to operate a pre-phase with the steps of:

priming the upper feed flow path with feed liquid provided from the feed source;
priming the upper wash flow path with wash liquid provided from the wash source; and
priming the upper eluent flow path with eluent liquid provided from a eluent source; and the preparative chromatography system (200) is arranged to operate an active preparative phase comprising a process cycle with the steps of:

equilibrating the chromatography device by providing wash liquid from the wash source to the chromatography device via the upper wash flow path;
loading feed liquid to the chromatography device by providing feed liquid from the wash source to the chromatography device via the upper feed flow path;
washing the chromatography device by providing wash liquid from the wash source to the chromatography device via the upper wash flow path;
performing elution in the chromatography device by providing eluent liquid provided from the eluent source to the chromatography device via the upper eluent flow path; and
re-equilibrating the chromatography device by providing wash liquid from the wash source to the chromatography device via the upper wash flow path.

According to one embodiment the preparative chromatography system is comprises: a feed pump provided in the upper feed flow path and arranged to provide the feed liquid to the chromatography device and an upper feed valve provided downstream of the feed pump in the upper feed flow path, a wash pump provided in the upper wash flow path and arranged to provide the wash liquid to the chromatography device, and an upper wash valve provided downstream of the wash pump in the wash flow path, and an eluent pump provided in the upper eluent flow path and arranged to provide eluent liquid to the chromatography device, and upper eluent valve provided downstream of the eluent pump in the eluent flow path; a monitoring unit provided downstream of the chromatography device; and a lower valve provided downstream of the monitoring unit arranged to provide connection to either a waste container a fraction collector, and wherein the preparative chromatography system is arranged to operate the pre-phase with the steps of:

priming the upper feed flow path by controlling the feed pump and upper feed valve to load feed liquid to the feed flow path, and during this feed priming period the upper wash valve and the upper eluent valve are closed;
priming the upper wash flow path by controlling the wash pump and upper wash valve to load wash liquid to the wash flow path, and during this wash priming period the upper feed valve and the upper eluent valve are closed; and
priming the upper eluent flow path by controlling the eluent pump and upper eluent valve to load eluent liquid to the eluent flow path, and during this eluent priming period the upper wash valve and the upper feed valve are closed; and wherein the preparative chromatography system is arranged to operate the active preparative phase comprising a process cycle with the steps of:

equilibrating the chromatography device by controlling the wash pump and upper wash valve to load wash liquid to and through the chromatography device, and wherein the lower valve is set to the waste container, and during this step the upper feed valve and the upper eluent valve are closed;
loading feed liquid to the chromatography device by controlling the feed pump and upper feed valve to load feed liquid to and through the chromatography device, and wherein the lower valve is set to the waste container, and during this step the upper wash valve and the upper eluent valve are closed;
washing the chromatography device by controlling the wash pump and upper wash valve to load wash liquid to and through the chromatography device, and wherein the lower valve is set to the waste container, and during this step the upper feed valve and the upper eluent valve are closed;
performing elution in the chromatography device by controlling the eluent pump and upper eluent valve to load eluent liquid to and through the chromatography device, and wherein the lower valve is set to either the waste container or to the fraction collector, the setting depending on the content of eluate detected by the monitoring unit, and during this step the upper wash valve and the upper feed valve are closed; and
re-equilibrating the chromatography device by controlling the wash pump and upper wash valve to load wash liquid to and through the chromatography device, and wherein the lower valve is set to the waste container, and during this step the upper feed valve and the upper eluent valve are closed.

According to one embodiment the preparative chromatography system is arranged to the preparative chromatography system is arranged to operate with at least three process liquids, feed liquid, wash liquid and eluent liquid, and the preparative chromatography system comprises:

a feed source connected to a feed pump, a the wash source connected to wash pump and an eluent source connected to eluent pump;
a first chromatography device in connection with a first monitoring unit, a second chromatography device in connection with a second monitoring unit and a third chromatography device in connection with a third monitoring unit;
a first upper feed flow path provided from the feed source to the first chromatography device, a second upper feed flow path provided from the feed source to the second chromatography device and a third upper feed flow path provided from the feed source to the third chromatography device, wherein the upper feed flow paths are bifurcated downstream of the feed pump;

a first upper wash flow path provided from the wash source to the first chromatography device, a second upper wash flow path provided from the wash source to the second chromatography device and a third upper wash flow path provided from the wash source to the third chromatography device, wherein the upper wash flow paths are bifurcated downstream of the wash pump;

a first upper eluent flow path provided from the eluent source to the first chromatography device, a second upper eluent flow path provided from the eluent source to the second chromatography device and a third upper eluent flow path provided from the eluent source to the third chromatography device, wherein the upper eluent flow paths are bifurcated downstream of the eluent pump; and wherein the preparative chromatography system is arranged to operate an active preparative phase comprising a process cycle with the steps of:

equilibrating or washing one of the first, second or third chromatography devices with wash liquid provided from the wash source via one of first upper wash flow paths by engaging the wash pump, loading another of the first, second or third chromatography devices with feed liquid provided from the feed source via one of the upper feed flow paths by engaging the feed pump; and performing elution in the remaining of the first, second or third chromatography devices by providing eluent liquid from the eluent source via the one of the upper eluent flow path by engaging the eluent pump, and wherein the eluate is directed to a waste container or to the fraction collector, depending on the content of eluate detected by the monitoring unit.

According to one embodiment the preparative chromatography system is arranged according to:

the feed pump is connected to a first four-way valve, the wash pump is connected to a second four-way valve and the eluent pump is connected to a third four-way valve;

the first four-way valve is connected to a fourth four-way valve, a fifth four-way valve and a sixth four-way valve;

the second four-way valve is connected to the fourth four-way valve, the fifth four-way valve and the sixth four-way valve;

the third four-way valve is connected to the fourth four-way valve, the fifth four-way valve and the sixth four-way valve; and wherein the fourth four-way valve is connected to the first chromatography device, the fifth four-way valve is connected to the second chromatography device and the sixth four-way valve is connected to the third chromatography device, and wherein preparative chromatography system is arranged so that:

feed liquid is provided from the feed source to:

the first chromatography device via the first upper feed flow path by setting the first four-way valve to direct the flow to the fourth four-way valve and setting the fourth four-way valve to direct the flow to the first chromatography device;

the second chromatography device via the second upper feed flow path by setting the first four-way valve to direct the flow to the fifth four-way valve and setting the fifth four-way valve to direct the flow to the second chromatography device; and to the third chromatography device via the third upper feed flow path by setting the first four-way valve to direct the flow to the sixth four-way valve and setting the sixth four-way valve to direct the flow to the third chromatography device, and wash liquid is provided from the wash source to:

the first chromatography device via the first upper wash flow path by setting the second four-way valve to direct the flow to the fourth four-way valve and setting fourth four-way valve to direct the flow to the first chromatography device;

the second chromatography device via the second upper wash flow path by setting the second four-way valve to direct the flow to the fifth four-way valve and setting the fifth four-way valve to direct the flow to the second chromatography device; and to the third chromatography device via the third upper wash flow path by setting the second four-way valve to direct the flow to the sixth four-way valve and setting the sixth four-way valve to direct the flow to the third chromatography device, and eluent liquid is provided from the eluent source to:

the first chromatography device via the first upper eluent flow path by setting the third four-way valve to direct the flow to the fourth four-way valve and setting the fourth four-way valve to direct the flow to the first chromatography device;

the second chromatography device via the second upper eluent flow path by setting the third four-way valve to direct the flow to the fifth four-way valve and setting the fifth four-way valve to direct the flow to the second chromatography device; and to the third chromatography device via the third upper eluent flow path by setting the third four-way valve to direct the flow to the sixth four-way valve and setting the sixth four-way valve to direct the flow to the third chromatography device.

According to one embodiment the preparative chromatography system is arranged to operate with at least three process liquids, feed liquid, wash liquid and eluent liquid, and wherein the preparative chromatography system comprises:

a feed source, a wash source and an eluent source;

a first pump, a second pump, a first waste container and a common valve connected to the chromatography device, and wherein the preparative chromatography system provides:

first chromatography flow paths which pass the first pump from at least one of the process liquid sources to the common valve, and second chromatography flow paths which pass the second pump from at least one of the process liquid sources to the common valve;

first waste flow paths which pass the first pump from at least one of the process liquid sources to the first waste container, and second waste flow paths which pass the second pump from least one of the process liquid sources to the common valve; and wherein, during a process cycle the preparative chromatography system is arranged to while the first pump is engaged in providing a process liquid to the chromatography device, the second pump is at least partly simultaneously engaged in providing a process liquid to the waste container via one of the second waste flow paths.

According to one embodiment the preparative chromatography system is arranged to execute a predetermined chromatography device sequence that defines the order of process liquids that are to be run through the chromatography device, and in one step, one of the first pump and the second pump provides a process liquid to the chromatography device, and least partly simultaneously the other of the first pump and the second pump primes its associated flow path with the process liquid that according to the chromatography device sequence the next process liquid to be provided to the chromatography device.

According to one embodiment the preparative chromatography system is arranged to operate by executing the steps of:
  equilibrating the chromatography device by engaging the first pump to provide wash liquid from the wash source via the first wash chromatography flow path to the chromatography device and at least partly simultaneously priming at least the second pump with feed liquid by engaging the second pump to provide feed liquid from the feed source to the first waste container via the second feed waste flow path;
  loading feed to the chromatography device by engaging the second pump to provide feed liquid from the feed source via the second feed chromatography flow path to the chromatography device and at least partly simultaneously priming at least the first pump with wash liquid by engaging the first pump to provide wash liquid from the wash source to the first waste container via the first wash waste flow path;
  washing the chromatography device by engaging the first pump to provide wash liquid from the wash source via the first wash chromatography flow path to the chromatography device and at least partly simultaneously priming at least the second pump with wash liquid by engaging the second pump to provide wash liquid from the wash source to the first waste container via the second wash waste flow path;
  continuing washing the chromatography device by engaging the second pump to provide wash liquid from the wash source via the second wash chromatography flow path to the chromatography device and at least partly simultaneously priming at least the first pump with eluent liquid by engaging the first pump to provide eluent liquid from the eluent source to the first waste container via the first eluent waste flow path;
  performing elution in the chromatography device by engaging the first pump to provide eluent liquid from the eluent source via the first eluent chromatography flow path to the chromatography device and at least partly simultaneously priming at least the second pump with wash liquid by engaging the second pump to provide wash liquid from the wash source to the first waste container via the second wash waste flow path;
  re-equilibrating the chromatography device by engaging the second pump to provide wash liquid from the wash source via the second wash chromatography flow path to the chromatography device and at least partly simultaneously priming at least the first pump with wash liquid by engaging the first pump to provide wash liquid from the wash source to the first waste container via the first wash waste flow path.

According to one embodiment the preparative chromatography system is arranged to during the step of performing elution, the eluate from the chromatography device is by the lower valve directed to the fraction collector or to the second waste container based on the content of the eluate, which is determined from the signal output from the monitoring unit.

According to one embodiment the preparative chromatography system comprises an upper monitoring unit arranged prior in the flow direction to the first waste container, and the upper monitoring unit is arranged to analyze the contents in the first waste flow paths and the second waste flow paths.

Thanks to the present invention the hold-up volume is lowered this facilitate the use of small volume chromatography devices in preparative chromatography systems. This is of particular importance in preparative chromatography processes utilizing a high number of process cycles. Compared to a prior art preparative chromatography system the hold-up volume is reduced ten-to hundred-fold. Thereby the resolution is increased and the broadening of chromatography peaks, the dispersion, may be significantly reduced. Additionally, the consumption of process liquids is significantly reduced. In the same manner the processing time is significantly reduced.

One advantage of the present invention is that the preparative chromatography systems may comprise a plurality of chromatography devices and still the advantageous low hold-up volume is preserved.

A further advantage is that the above described method and system may be adapted to utilize a larger plurality of process liquids, for example a plurality of different wash (buffer) liquids.

A further advantage of the present invention is that system configuration provides for a high degree of flexibility in designing the process sequences and a high efficiency in using the systems.

In the following, the invention will be described in more detail, by way of example only, with regard to non-limiting embodiments thereof, reference being made to the accompanying drawings.

BRIEF DESCRIPTION OF THE DRAWINGS

FIGS. 3a-h are schematic illustration of different operational modes of the preparative chromatography system according to one embodiment of the present invention;

FIGS. 6a-k are schematic illustration of different operational modes of the preparative chromatography system according to one embodiment of the present invention;

FIGS. 10a-b are schematic chromatograms obtained using: a) a typical prior art system and b) the preparative chromatography system and method according to one embodiment according to the present invention.

DETAILED DESCRIPTION

The following description is for illustration and exemplification of the invention only and is not intended to limit the invention to the specific embodiments described.

Unless defined otherwise, technical and scientific terms have the same meaning as commonly understood by one of ordinary skill in the art to which this invention belongs.

All references cited herein, including patent applications and publications, are incorporated by reference in their entirety.

Terms like "upper", "upstream", "lower" and "downstream" are used herein to relate to the general liquid flow direction of the chromatography system and to indicate the order of parts and units of the system and are not intended to limit the invention in any manner. "Upper" parts refer to portions of the flow paths of a chromatography system that is upstream of the central unit, i.e. the chromatography device or devices. "Lower", accordingly, refers to portions downstream of the chromatography device.

The system and method according to the invention, in its different embodiments, will be described using three basic process liquids: eluent, wash and feed. This is meant as an illustrative example representing a minimum set of process liquids and the skilled person understands that more and/or other process liquids could be, and often is, used. For example, typically a number of different buffers are used for the washing and equilibration of the chromatography devices. Also controlled variation of the mobile phase composition during the chromatography run, so called gradient chromatography, may be combined with the methods and systems according to embodiments of the invention, with adaptions apparent for the skilled person.

To some extent a functional languish is used to describe configurations and settings of the described preparative chromatography system: The term "connected" as in "pump A connected to valve B", should be understood to mean that fluid communication is provided between the two units, for example with a tubing or a channel; The phrase "setting valve A to connect source B a with container C" should be understood that the valve A has a setting, and is set, to provide a fluid communication between source B and container C. Such functional languish is for brevity only and the person skilled in the art should have no problem in providing the configurations or the correct settings. A functional languish is used also with reference to specific parts of the system, such as valves. A four-way valve, for example, may be realized by an actual four-way valve, utilizing a part of a multi-way valve or combining for example a two-way valve and a three-way valve. Similarly, the function of a check valve may be provided by a control valve.

Figures 1, 2A:
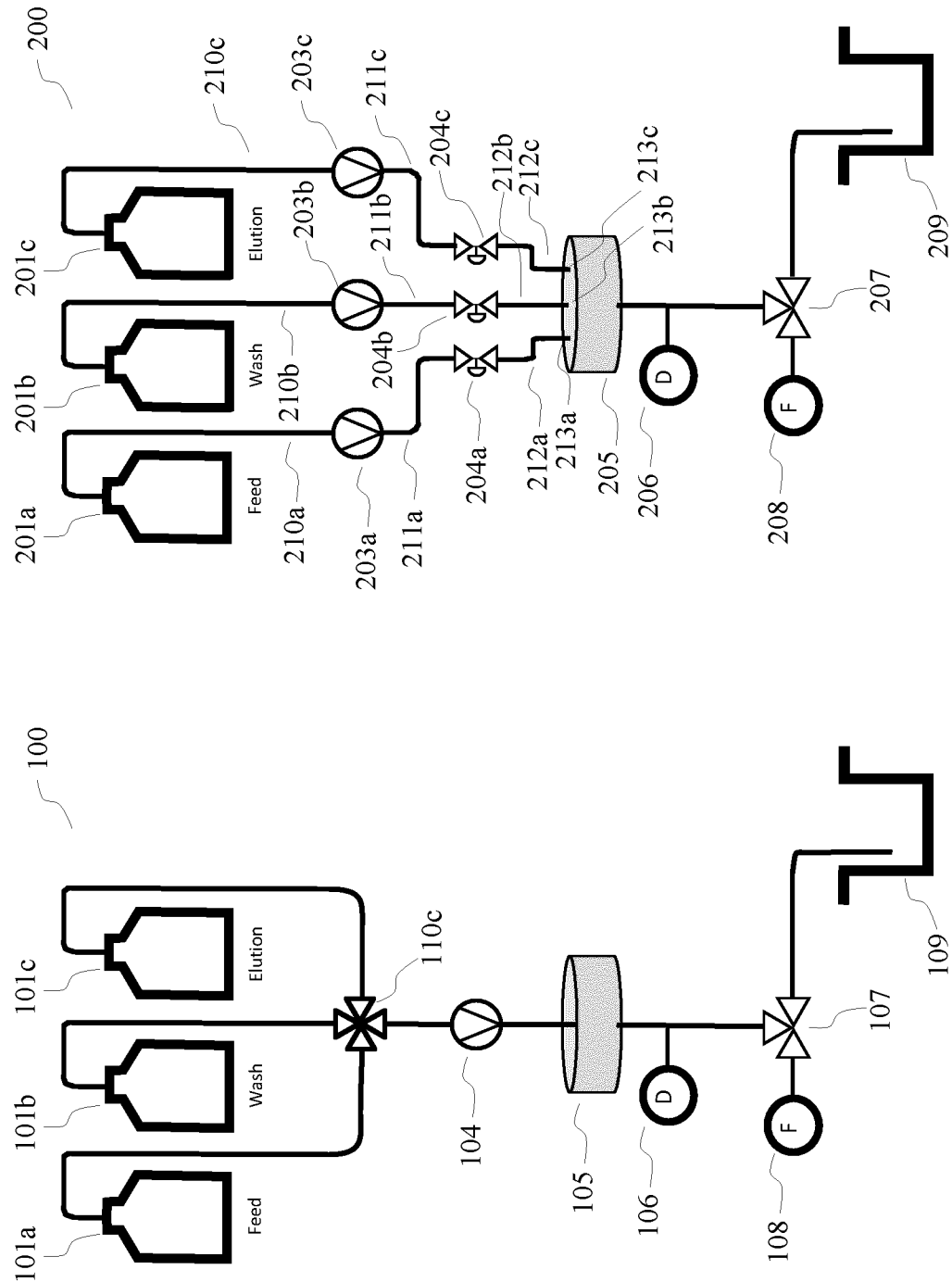
FIG. 1 is a schematic illustration of a prior art preparative chromatography system.
FIGS. 2a-h are schematic illustration of embodiments of the preparative chromatography system according to the present invention.

To facilitate the understanding of the present invention a prior art preparative chromatography system is briefly described with reference to the schematic illustration of FIG. 1. The prior art preparative chromatography system 100 comprises a feed source 101a, an eluent source 101b and a wash source 102b for providing the process liquids, feed, eluent and wash. The feed source 101a, eluent source 101b and wash source 102b are all via suitable tubing arrangements connected to a common first valve 103 which in turn is connected, via first common tubing arrangement 111, to a common pump 104 which is further connected, via second common tubing arrangement 112, to a chromatography device 105, for example a conventional packed bed column. The first valve is arranged to direct a flow from either of the three sources to a common valve outlet. The chromatography device 105 is connected to a monitoring device 106 in connection with a lower valve 107 which is arranged to direct a flow to either a fraction collector 108 or a waste container 109. As illustrated in FIG. 1 the prior art system has a common flow path, indicated with a dotted line, that extends from the common first valve 103 via the first common tubing arrangement 110, the common pump 104, and via the second common tubing arrangement, to the chromatography device 105. The length of the common flow path and the number and type of units (pumps and valves, for example) is, as recognized by the skilled person, directly relating to the hold-up volume in the system 100. It should be noted that not only the volumes formed in the tubing is of importance, the volumes contained within for example a valve, especially a more complex valve with multiple inlet and/or outlets, are typically substantial. However, in the depicted prior art system 100, the hold-up volume, with a reasonably skilled selection of units and tubing, is small compared to the volume of the conventional column containing porous bead-based chromatography medium, and not a major concern regarding the systems overall performance.

The preparative chromatography system 200 for chromatography separations of biological or chemical samples according to the present invention is schematically illustrated in FIG. 2a. The preparative chromatography system 200 comprises a feed source 201a, a wash source 201b and an eluent source 201c and for providing the process liquids, feed, wash and eluent. The feed source 201a is via first feed tubing arrangement 210a, a feed pump 203a, a second feed tubing arrangement 211a, an upper feed valve 204a, and via a third feed tubing arrangement 212a connected to a chromatography device 205. The wash source 202b is via first wash tubing arrangement 210b, a wash pump 203b, a second wash tubing arrangement 211b, an upper wash valve 204b, and via a third wash tubing arrangement 212b connected to the chromatography device 205. The eluent source 201c is via first eluent tubing arrangement 210c, an eluent pump 203c, a second eluent tubing arrangement 211c, an upper eluent valve 204c, and via a third eluent tubing arrangement 212c connected to the chromatography device 205. The chromatography device 205 is preferably a low volume device such as a membrane chromatography device and even more preferably a fiber-based membrane chromatography device. The chromatography device 205 is connected to a monitoring unit 206 in connection with a lower valve 207 which is arranged to direct a flow to either a fraction collector 208 or a waste container 209. The monitoring unit 206 may comprise one detector, for example an UV detector, a Photo Diode Array (PDA) detector or a combination of detectors such as an UV detector combined with a Mass Spectrometer (MS). As appreciated by the skilled person a number of fraction collectors may be utilized and also a number of separate waste containers.

The preparative chromatography system 200 further comprises a control unit (not shown) that is in communicative connection with at least the pumps 203a, 203b, 203c and the lower valve 207, which typically is a three-way control valve. If control valves are used, the upper valves 204a, 204b, 204c, may also be connected to, and controlled by the control unit. A control unit and valves controlled by the control unit are provided also in the other embodiments presented here below.

Figure 2C:
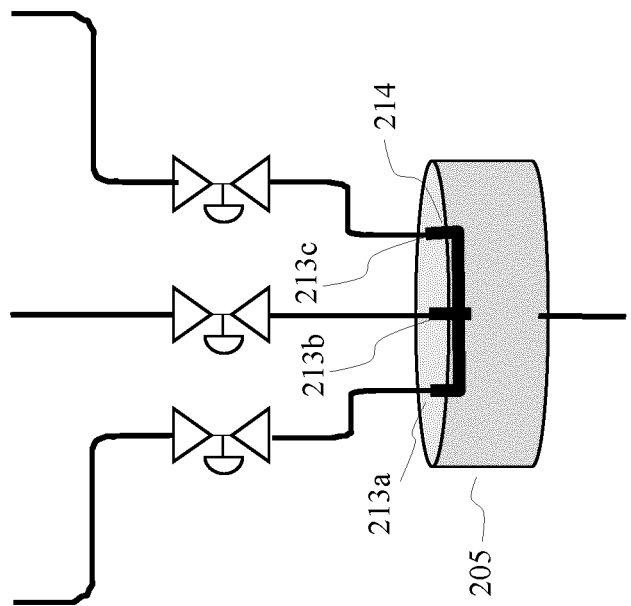
Figure 2B:
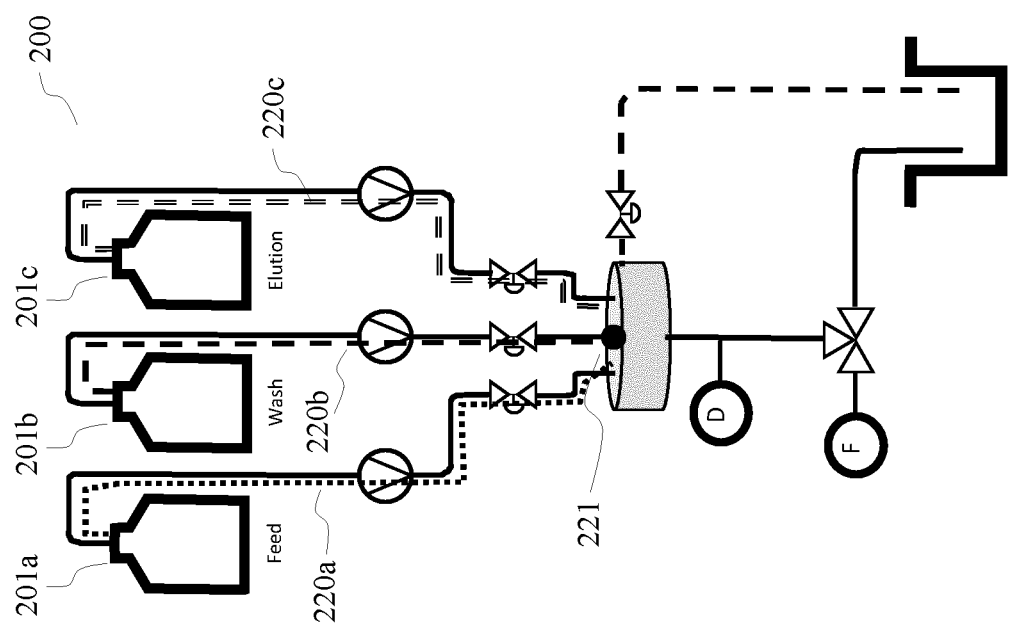

As illustrated in FIG. 2b the preparative chromatography system 200 according to the invention provides separate and individual upper flow paths from respective process liquid source to, or as close to, the chromatography device 205. The individual upper flow paths end at a mixing point 221 defined as the first location in the flow direction there a process liquid will meet and mix with another process liquid. The feed upper flow path 220a is indicated with a dotted line, the wash upper flow path 220b with a dashed line and the eluent upper flow path 220c with a double dashed line. In FIG. 2a the mixing point will be in the upper portion of the chromatography device 205. Systems with a plurality of mixing points could be envisaged, for example if the feed upper flow path joins the wash flow path upstream of joining the eluent upper flow path. The introduction of separate pumps and valves for each upper flow path, minimizes the length of the common flow path, the common flow path in the embodiment illustrated in FIG. 2a being limited to an upper portion of the chromatography device 205 wherein the process liquids will initially mix upon changing from one process liquid to another. This may be compared to the longer flow path discussed with references to the prior art system of FIG. 1. Hence, the novel design makes it possible to significantly reduce the hold-up volume. The novel design of the preparative chromatography system 200 facilitates a standby mode, wherein each of the feed flow path, the eluent flow path and the wash flow path are filled with respective process liquid. Hence, during the process cycle, upon shifting from one process liquid the next process liquid is always directly available and a minimum of unwanted mixing of the process liquids will occur. This will be further discussed in describing the method of operation according to the invention.

The chromatography device 205 is in FIG. 2a illustrated with a plurality of inlets, a feed inlet 213a, a wash inlet 213b and an eluent inlet 213c. To control the liquid flow within the chromatography device 205 an internal manifold 214a may be provided in an inlet portion of the chromatography device 205, which is an embodiment of the invention schematically illustrated (only relevant part of system is illustrated) in FIG. 2c. The internal manifold 214a provides fluid communication from the feed inlet 213a, the wash inlet 213b and the eluent inlet 213c to a common manifold outlet 215a arranged to provide the process liquids to the active portion of the chromatography device 205, i.e. The portion holding the chromatography medium. The internal manifold 214a ensures that all process liquids will enter the active portion of the chromatography device 205 at the same position. In this embodiment the feed flow path, indicated with a dotted line, the eluent flow path, dashed line, and the wash flow path, double dashed line, extends from respective source to the bifurcation point of the internal manifold 214b.

Figure 2E:
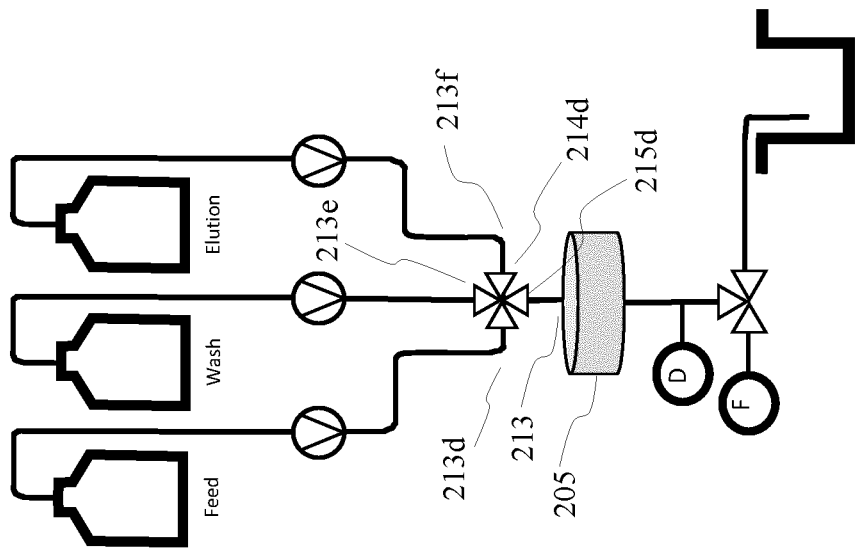
Figure 2D:
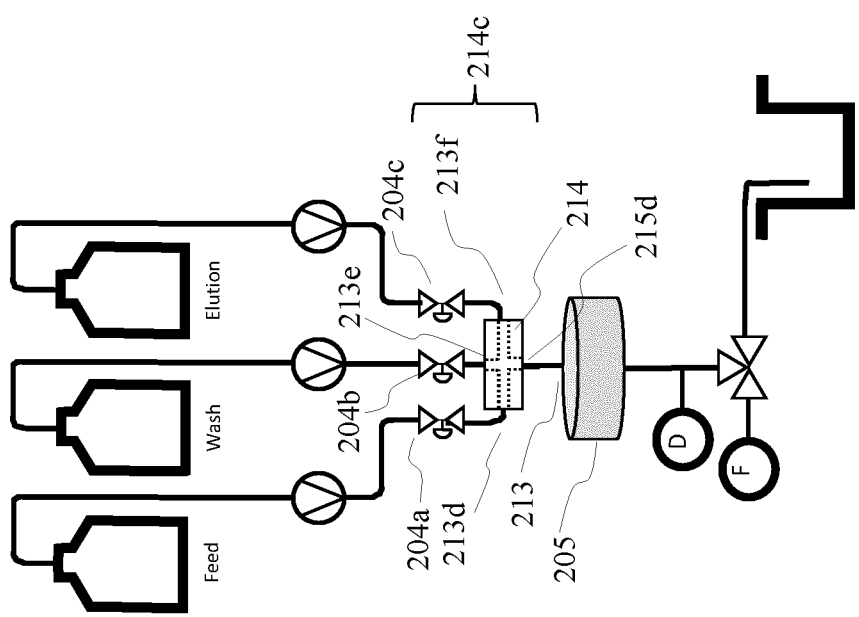

In one embodiment, schematically illustrated in FIG. 2d the chromatography device 205 has a single inlet 213 and the system 200 is provided with an external manifold 214b which provides fluid communication from the feed inlet 213d, the wash inlet 213e and the eluent inlet 213f to a common external manifold outlet 215b. The common external manifold outlet 215b is connected to the single inlet 213 of the chromatography device 205. In this embodiment the feed flow path, indicated with a dotted line, the eluent flow path, dashed line, and the wash flow path, double dashed line, extends from respective source to the bifurcation point of the external manifold 214b. Preferably and according to one embodiment of the invention, each upper valve 204a, 204b, 204c is arranged close to respective inlet of the external manifold 214b to form a valve manifold assembly 214c. "Close" should be understood as placing the upper valves as close as possible to the external manifold 214b taking into account the construction details of the different objects. Functionally the valve manifold assembly 214c can be seen as a manifold with inlet valves which only permits flow in the downstream direction, for example check-valves, so that one process liquid can not enter the upstream flow path of another process liquid.

According to one embodiment, schematically illustrated in FIG. 2e, a valve manifold assembly is realized by a multiway valve 214d, for example a four-way valve, arranged with three inlets and one outlet. For each valve position the multiway valve 214d opens between one of the inlets and the outlet and keeps the remaining inlets closed.

Figure 2G:
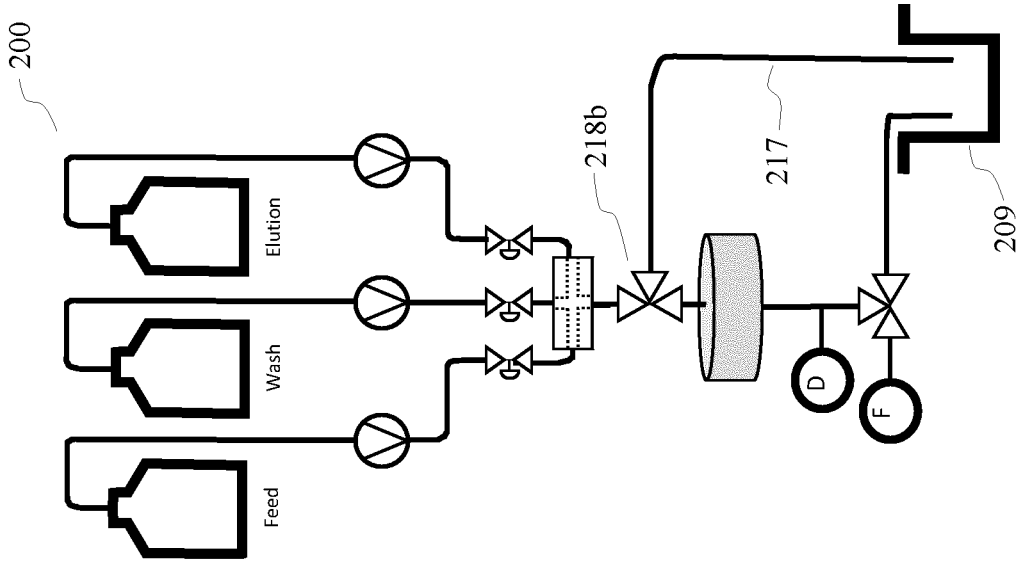
Figure 2F:
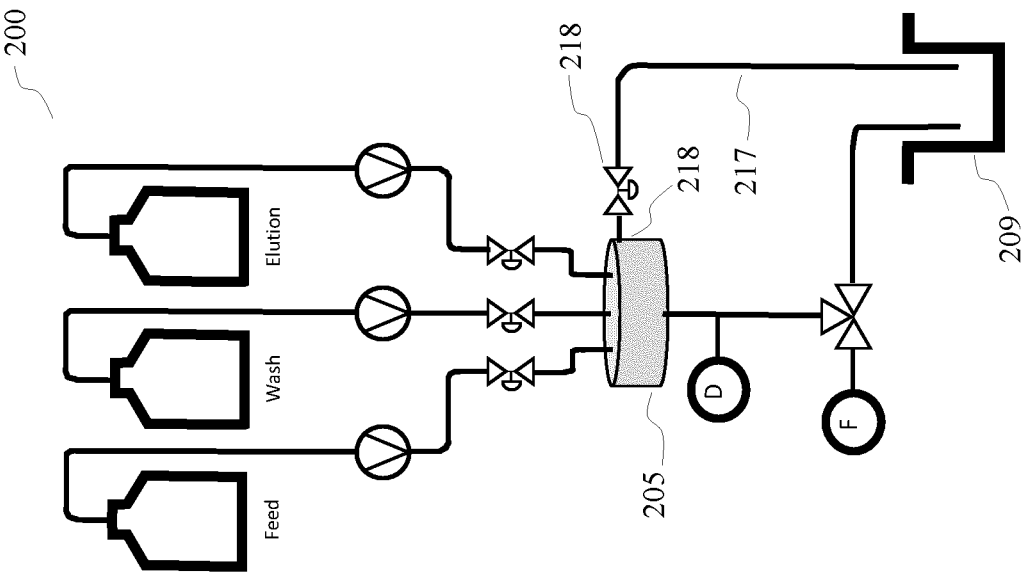

According to embodiments of the invention the preparative chromatography system 200 is provided with a purging arrangement 216, schematically illustrated in FIG. 2f-g. According to one embodiment, illustrated in FIG. 2f, a fluid communication is arranged by a tubing arrangement 217 between a purging outlet 218 of the chromatography device 205, preferably provided in close proximity to the inlet 213 or inlets 213a, 213b, 213c of the chromatography device 205, and the waste container 209. A purging valve 218, which is a control valve connected to and under control by the control unit, regulates the flow of process liquid from the chromatography device 205 to the waste container 209.

In an alternative embodiment of the purging arrangement 216, schematically illustrated in FIG. 2g, an external manifold 214b or valve manifold assembly 214c is provided and a purging valve 218b is provided between and connected to the external manifold outlet 215b and the chromatography device inlet 213. In this embodiment the purging valve 218b is preferably a three-way control valve that is arranged to either provide fluid communication to the chromatography device 205 or to the waste container 209 and connected to and controlled by the control unit.

A further alternative embodiment of the purging arrangement 216 is that each of the feed flow path 220a, the wash flow path 220b and the eluent flow path 220c, are each provided with a purging valve. This could be realized by providing the upper valves 203a, 203b, 203c, as three-way valves arranged to provide fluid communication to either the chromatography device 205, to the waste container 209 or to be in a closed position.

Figure 2H:
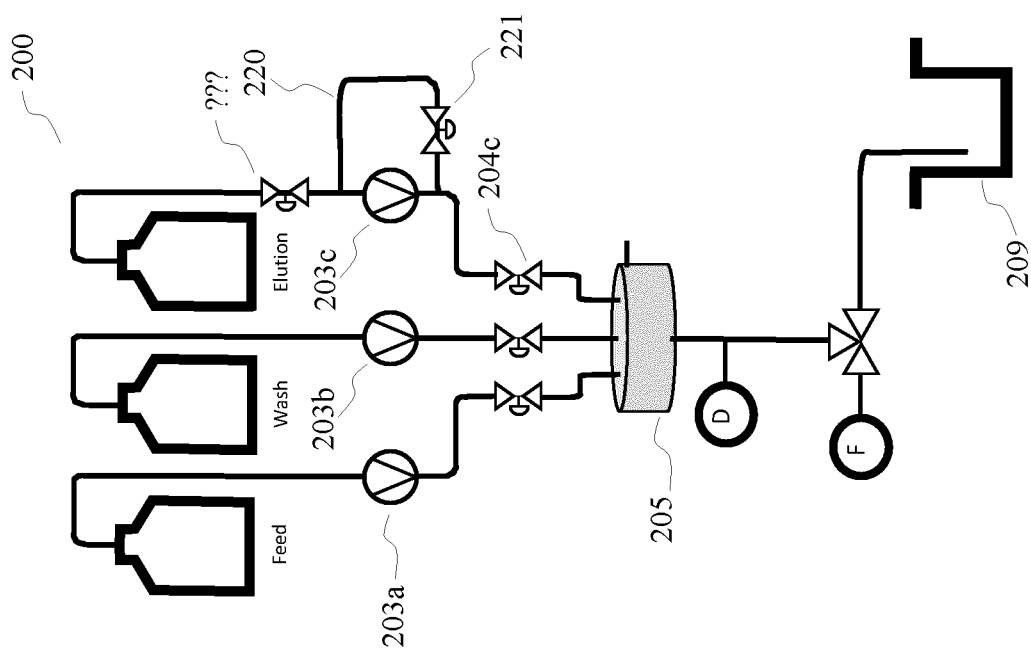

According to one embodiment of the invention, schematically illustrated in FIG. 2h, at least the eluent flow path is provided with means for circulating the eluent in a loop configuration 220. The loop configuration 220 includes the eluent pump 203c and a loop control valve 221 and a tubing arrangement that joins the first eluent tubing arrangement 210c upstream, and the second eluent tubing arrangement 211c downstream of the eluent pump 203c. A valve 220, preferably a control valve, is provided upstream of the connection of the loop tubing and the first eluent tubing arrangement 210c. Alternatively, the connection of the connection of the loop tubing to the first eluent tubing arrangement 210c may be by a three-way valve. The loop configuration 220 and provides a continuous circulation of the eluent in the loop upstream the upper eluent valve 204c and that the eluent pump 203b may be running continuously. The loop configuration 220 reduces the negative effects of the ramp up time, which otherwise contribute to the hold-up time/volume of the system upon shifting between different process liquids. Also the feed and wash flow paths may be provided with corresponding loop configurations.

Figure 4:
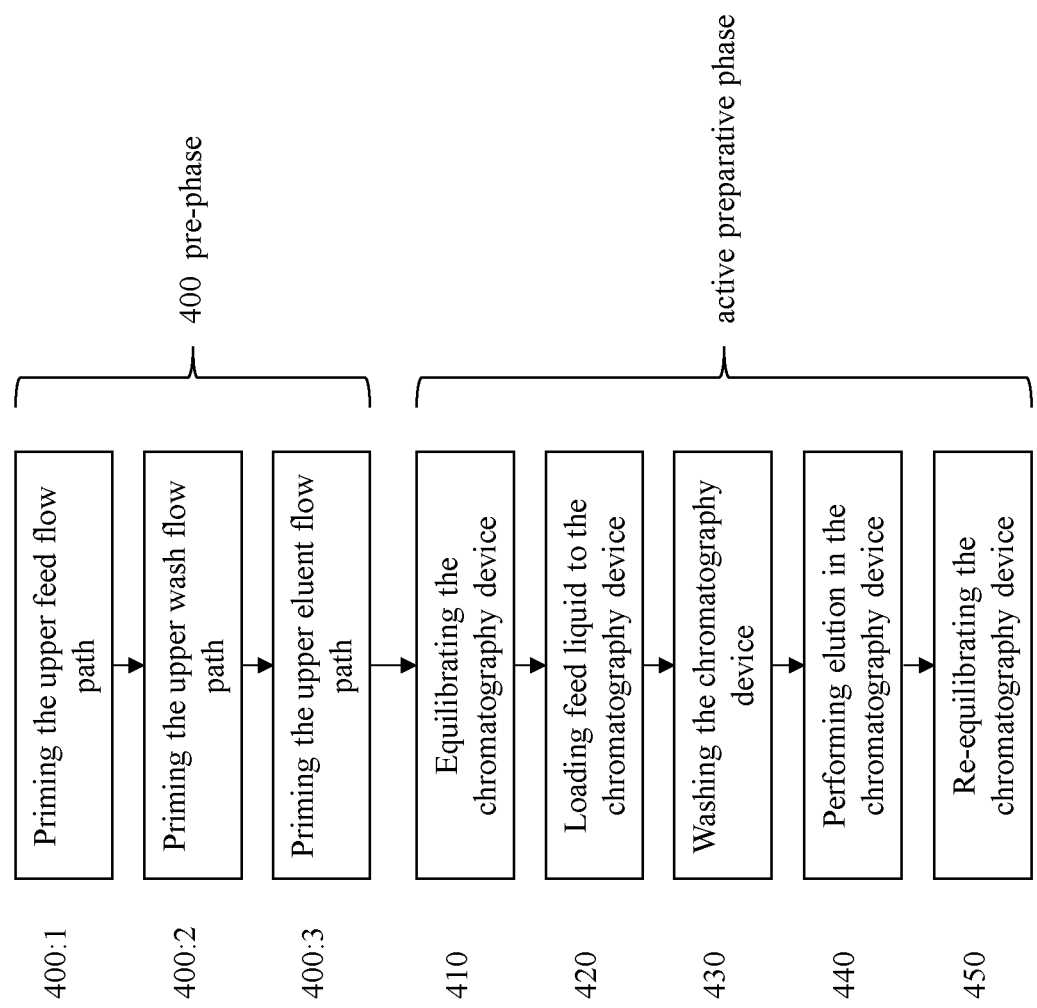
FIG. 4 is a flowchart illustrating an embodiment of the method according to the present invention.

The method of the invention of operating a preparative chromatography system will be described with references to the flow path illustrations of FIGS. 3a-h and to the flowchart of FIG. 4. Reference will be made to the preparative chromatography system 200 described with references to FIGS. 2a-f as an illustrative, but not limiting, example of a preparative chromatography system suitable to execute the method of the invention. FIGS. 3a-h comprises an upper part illustrating the preparative chromatography system with different settings to perform the steps of the method and for FIGS. 3d-g also a lower part being schematic graphs illustrating an output from the monitoring unit 206, wherein a solid line indicated the output relevant for the present step and a dashed line the previous steps.

The method comprises a pre-phase 400 with the pre-steps, not necessarily performed in the below order, illustrated in FIGS. 3a-c of:

- 400:1: priming the upper feed flow path 220a with feed liquid provided from the feed source 201. According to one embodiment by controlling the feed pump 203a and upper feed valve 204a to load feed liquid to the feed flow path 220a, and during the feed priming period the upper wash valve 204b and the upper eluent valve 204c are closed;
- 400:2: priming the upper wash flow path 220b with wash liquid provided from the wash source 201b, According to one embodiment by controlling the wash pump 203b and upper wash valve 204b to load wash liquid to the wash flow path 220b, and during this wash priming period the upper feed valve 204a and the upper eluent valve 204c are closed;
- 400:3: priming the upper eluent flow path 220c with eluent liquid provided from an eluent source 201c. According to one embodiment by controlling the eluent pump 203c and upper eluent valve 204c to load eluent liquid to the eluent flow path 220c, and during this eluent priming period the upper wash valve 204b and the upper feed valve 204a are closed;

The pre-phase 400 thereby providing a standby mode with the process liquids loaded at least up to a mixing point.

Following the pre-phase the preparative chromatography system 200 will shift to an active preparative phase and perform the actual separation process, steps 410-450. The separation process is repeated, or cycled, a predetermined number of times, a predetermined time period or until a predetermined criteria is fulfilled, for example until a predetermined fraction volume has been collected, or that all feed liquid has been consumed. The order of the steps, the duration of the steps as well as other process parameters are stored in a process file and executed by the control unit. the steps to be taken consecutively:

- 410: Equilibrating the chromatography device by providing wash liquid from the wash source 201b to the chromatography device 205 via the upper wash flow path 220b. According to one embodiment by controlling the wash pump 203b and upper wash valve 204b to load wash liquid to and through the chromatography device 205, and wherein the lower valve 207 is set to the waste container 209, and during this step the upper feed valve 204a and the upper eluent valve 204c are closed;
- 420: Loading feed liquid to the chromatography device by providing feed liquid from the wash source 201a to the chromatography device 205 via the upper feed flow path 220a. According one embodiment by controlling the feed pump 203a and upper feed valve 204a to load feed liquid to and through the chromatography device 205, and wherein the lower valve 207 is set to the waste container 209, and during this step the upper wash valve 204b and the upper eluent valve 204c are closed;
- 430: Washing the chromatography device by providing wash liquid from the wash source 201b to the chromatography device 205 via the upper wash flow path 220b. According to one embodiment by controlling the wash pump 203b and upper wash valve 204b to load wash liquid to and through the chromatography device 205, and wherein the lower valve 207 is set to the waste container 209, and during this step the upper feed valve 204a and the upper eluent valve 204c are closed;
- 440: Performing elution in the chromatography device by providing eluent liquid provided from the eluent source 201c to the chromatography device 205 via the upper eluent flow path 220c. According to one embodiment by controlling the eluent pump 203c and upper eluent valve 204c to load eluent liquid to and through the chromatography device 205, and wherein the lower valve 207 is set to either the waste container 209 or to the fraction collector 208, the setting depending on the content of eluate detected by the monitoring unit 206, and during this step the upper wash valve 204b and the upper feed valve 204a are closed;
- 450: Re-equilibrating the chromatography device by providing wash liquid from the wash source 201b to the chromatography device 205 via the upper wash flow path 220b. According to one embodiment by controlling the wash pump 203b and upper wash valve 204b to load wash liquid to and through the chromatography device 205, and wherein the lower valve 207 is set to the waste container 209, and during this step the upper feed valve 204a and the upper eluent valve 204c are closed.

After the first cycle, the equilibrating step 410 may be optional or combined with re-equilibrating step 450.

The duration of each step may preferably be dynamically determined using a so called watch-function which utilizes output from the monitoring unit 206 to determine that the treatment of the chromatography device 205, which is the purpose of the step, has had the expected effect. Alternatively, certain steps utilize a watch-function, while for others, for example less critical to the performance, the duration is a time based parameter.

According to one embodiment of the method the one or more of the sub-steps of the pre-phase comprises purging the individual upper flow path by controlling a purge valve to be open and guide the flow of the process liquid to the waste container 209.

According to one embodiment at least the eluent upper flow path 220c is provided with loop configuration 220 and during the steps of the active separation phase, the eluent pump 203c is controlled to be active at all times and a loop control valve 221 to be open if the upper eluent valve 204c is closed, i.e. at all steps except the separation step loading eluent to the chromatography device 205.

Figure 5A:
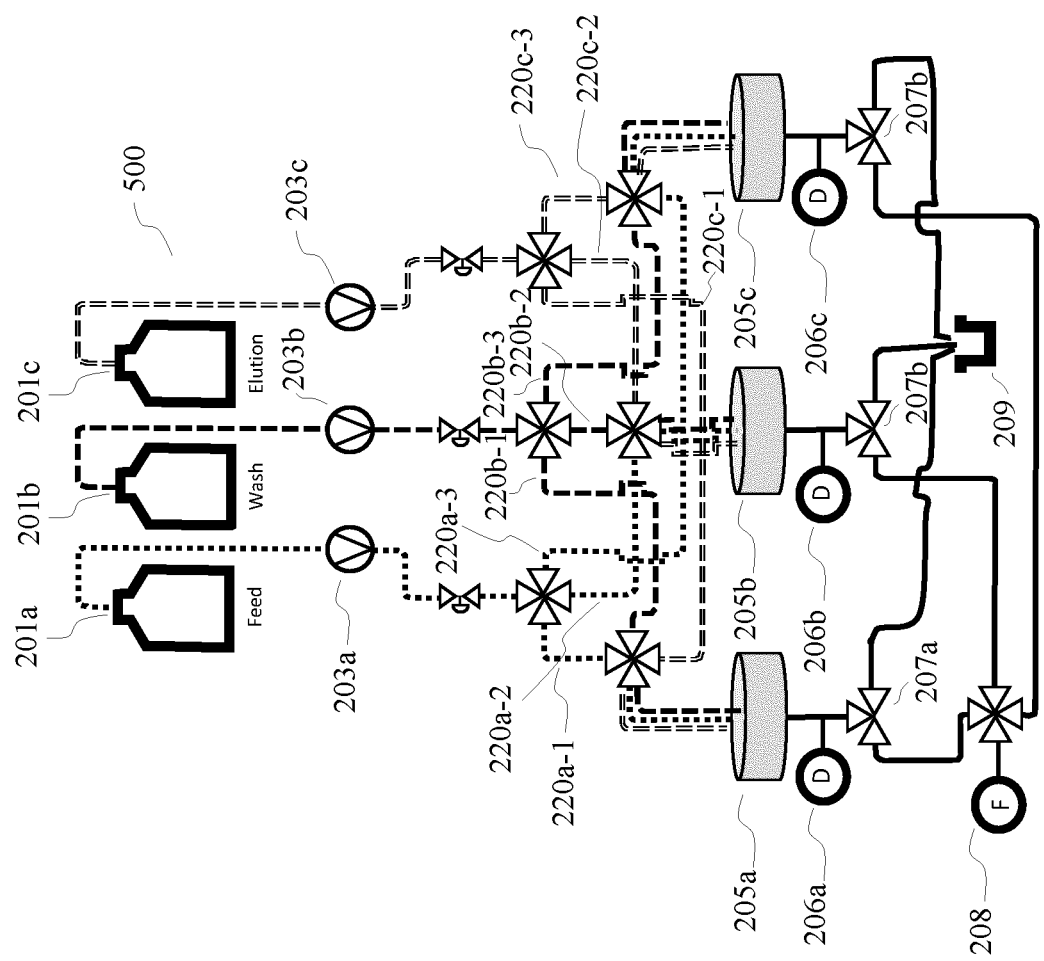
FIGS. 5a-b are schematic illustration of embodiments of the preparative chromatography system according to the present invention.
Figure 5B:
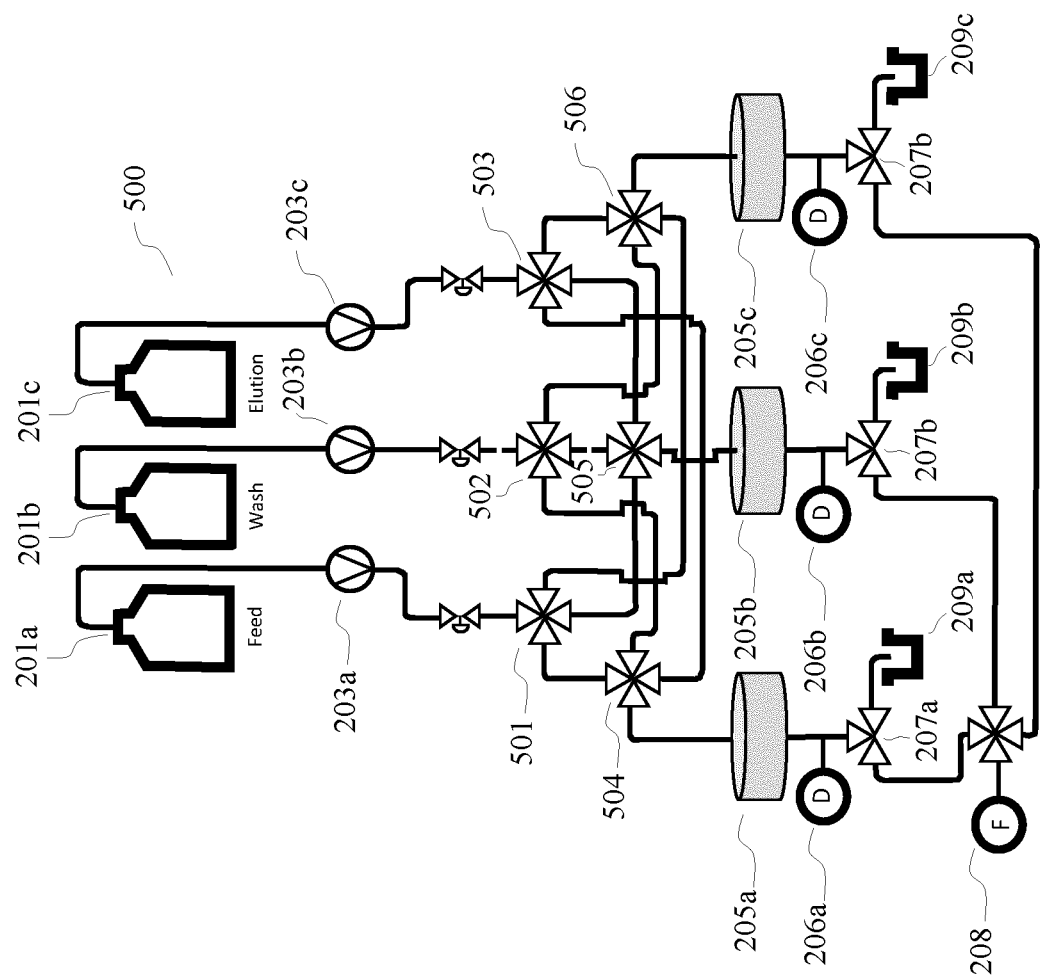

One embodiment of the invention, schematically illustrated in FIG. 5a-b is a preparative chromatography system 500 comprising a plurality of chromatography devices, for example, but not limited to a first 205a, a second 205b and a third 205c chromatography device. Illustrated in FIG. 5a are the main flow path of the preparative chromatography system 500.

The preparative chromatography system 200 comprises a feed source 201a, a wash source 202b and an eluent source 201c and for providing the process liquids, feed, wash and eluent. To each source is an associated pump, a feed pump 203a, a wash pump 203b and an eluent pump 203c arranged as in the embodiments described above. Downstream of the pumps the individual flow paths bifurcate by an arrangement of tubing and valves so that: A first upper feed flow path 220a-1 is provided from the feed source 201a to the first chromatography device 205a, a second upper feed flow path 220a-2 is provided from the feed source 201a to the second chromatography device 205b and a third upper feed flow path 220a-3 is provided from the feed source 201a to the third chromatography device 205c, indicated by dotted lines. A first upper wash flow path 220b-1 is provided from the wash source 201b to the first chromatography device 205a, a second upper wash flow path 220b-2 is provided from the wash source 201a to the second chromatography device 205b and a third upper wash flow path 220a-3 is provided from the wash source 201a to the third chromatography device 205c, indicated by dashed lines. A first upper eluent flow path 220c-1 is provided from the eluent source 201c to the first chromatography device 205a, a second upper eluent flow path 220b-2 is provided from the eluent source 201a to the second chromatography device 205b and a third upper eluent flow path 220c-3 is provided from the eluent source 201a to the third chromatography device 205c, indicated by dashed lines.

The preparative chromatography system 200 may be operated, for example, according to a parallel hierarchy as compared to conventional systems. For example, in various embodiments, a wash may be provided via the flow paths 220b-1, 220b-2 and 220b-3 substantially simultaneously to respective of the chromatography devices 205a, 205b, 205c.

Downstream of the chromatography devices one monitoring unit 206a, 206b, 206c are provided and in connection to each chromatography device 205a, 205b, 205c. Through tubing and valve arrangements the chromatography devices 205a, 205b, 205c are connected to either a common a waste container 209 and common fraction collector 208 (FIG. 5a), separate a waste containers 209a, 209b, 209c for each chromatography device 205a, 205b, 205c and a common fraction collector 208 (FIG. 5b), or to separate waste containers and separate fraction collectors for each chromatography device (not shown).

The embodiments described with reference to FIG. 2a-f, relating to purging and providing means for circulating one or more of the process liquids are relevant also for the preparative chromatography system 500 providing a plurality of chromatography devices.

According to one embodiment, schematically illustrated in FIG. 5b, the individual flow paths are realized by an arrangement of tubing and four-way valves. In the following description the term "connected" will be used to indicate that a unit, for example a four-way valve is via suitable tubing in fluid connection with for example a chromatography device and the details of the tubing will not be elaborated on. The feed pump 203a is connected to a first four-way valve 501, the wash pump 203b is connected to a second four-way valve 502 and the eluent pump 203c is connected to a third four-way valve 503. The first four-way valve 501, the second four-way valve 502 and the third four-way valve 503 may be seen as a first level process liquid distributing units. The first four-way valve 501 is connected to a fourth four-way valve 504, a fifth four-way valve 505 and a sixth four-way valve 506. The second four-way valve 502 is connected to the fourth four-way valve 504, the fifth four-way valve 505 and the sixth four-way valve 506. The third four-way valve 502 is connected to the fourth four-way valve 504, the fifth four-way valve 505 and the sixth four-way valve 506. The fourth four-way valve 504 is connected to the first chromatography device 205a, the fifth four-way valve 505 is connected to the second chromatography device 205b and the sixth four-way valve 506 is connected to the third chromatography device 205c. The fourth four-way valve 504, the fifth four-way valve 505 and the sixth four-way valve 506 may be seen as a second level process liquid distributing units, and mixing points, defined as above as the first location in the flow path there mixing of different process liquids will occur, will be in the fourth four-way valve 504, the fifth four-way valve 505 and in the sixth four-way valve 506. I.e. the mixing points will be on the same level, the second level. The four-way valves are arranged so that if they are open from an inlet to a first outlet/connection the two remaining outlets/connections are closed. Thereby the individual flow paths may be provided from each source to each chromatography device. For example, the feed source 201a is via the feed pump 203a connected to the first four-way valve 501 which in one position provides a flow path to the fourth four-way valve 504, which in turn, in one position opens the inlet connected to the first four-way valve 501 and provides a flow path to the first chromatography device 205a. A second position of the first four-way valve 501 provides a flow path to the fifth four-way valve 504, which in turn, in one position opens the inlet connected to the first four-way valve 501 and provides a flow path to the second chromatography device 205b.

One embodiment of the method according to the invention may utilize the preparative chromatography system 500 with a plurality of chromatography devices and will be described with references to the flow path illustrations of FIG. 6a-b and to the flowchart of FIG. 7. Reference will be made to the preparative chromatography system 500 described with references to FIG. 5a-b as an illustrative, but not limiting, example of a preparative chromatography system suitable to execute the method according to this embodiment.

Figure 6G:
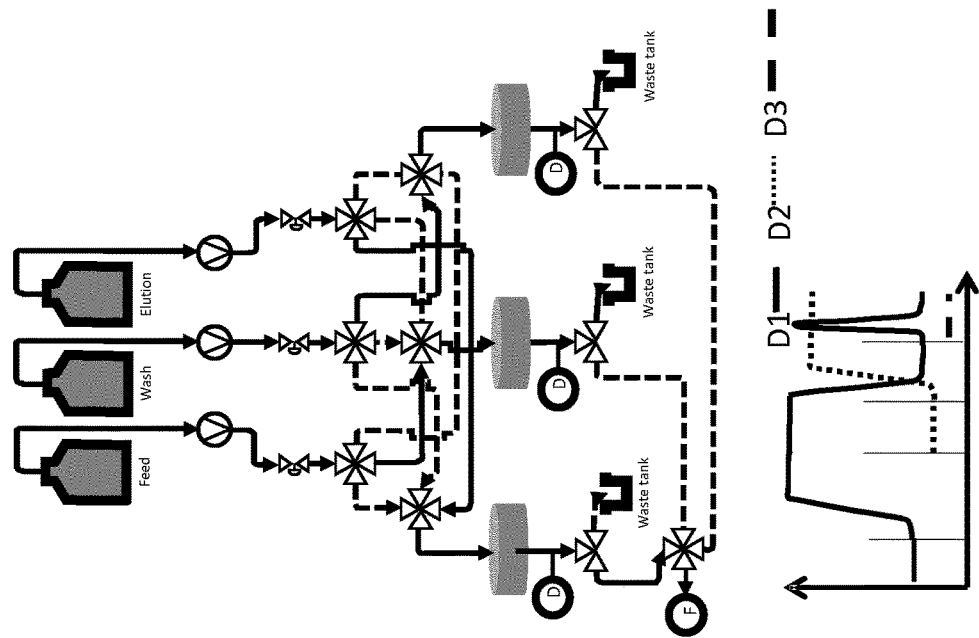
Figure 7:
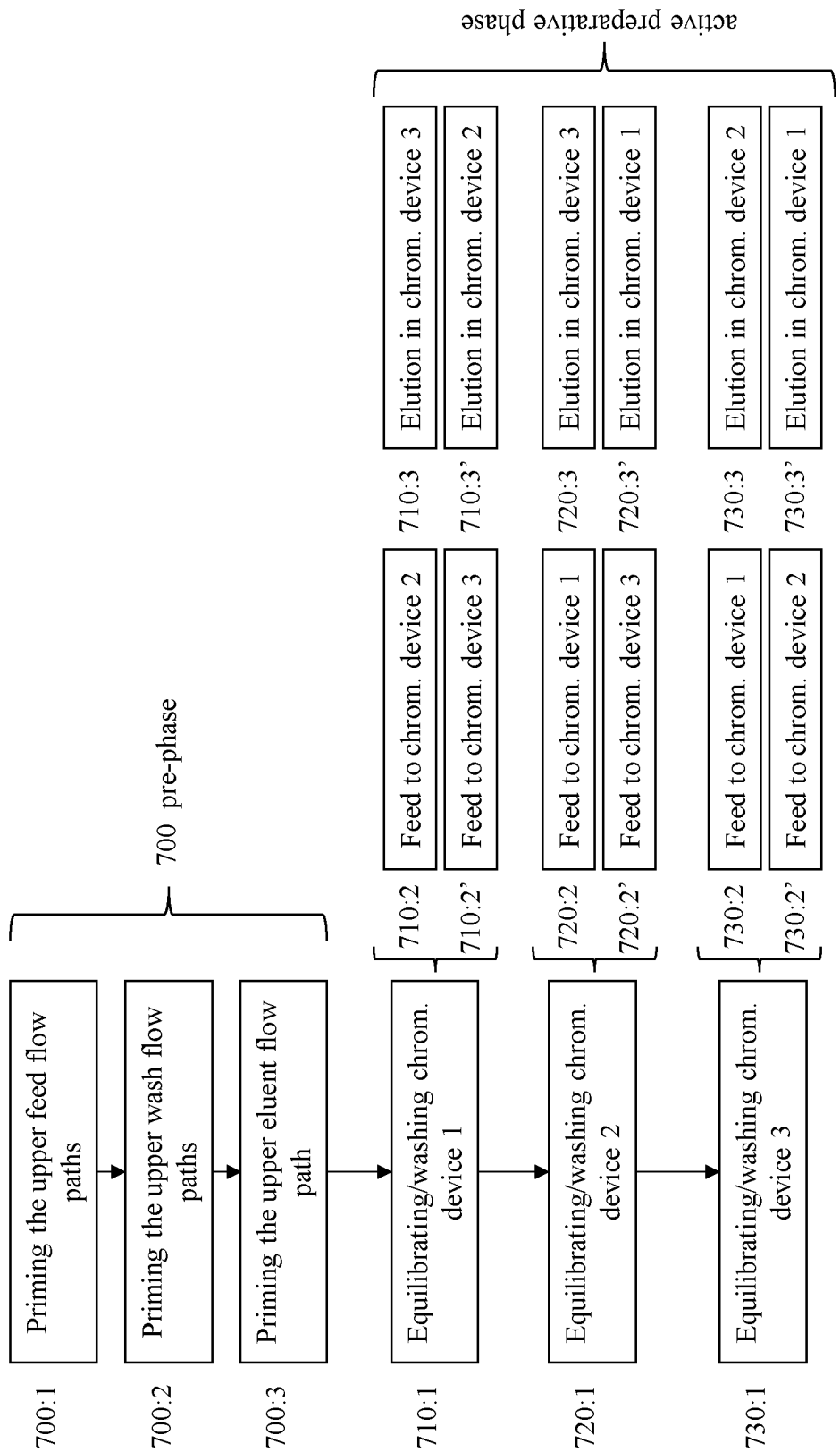
FIG. 7 is a flowchart illustrating an embodiment of the method according to the present invention.

FIG. 6a-b are examples of how the preparative chromatography system 500 maybe operated wherein:
a) illustrates the system in a standby mode,
b) elution in the first chromatography device 205a and equilibration in the third chromatography device 205c,
c) washing of the first chromatography device 205a,
d) loading feed into the first chromatography device 205a,
e) loading feed into first chromatography device 205a and equilibrating the second chromatography device 205b,
f) washing of the first chromatography device 205a and loading feed into second chromatography device 205b,
g) loading elute into first chromatography device 205a, loading feed into second chromatography device 205b and equilibrating third chromatography device 205c,
h) first chromatography device 205a on hold, washing of second chromatography device 205b loading of feed into third chromatography device 205c,
i) equilibrating of the first chromatography device 205a, loading eluate into second chromatography device 205b, loading feed into third chromatography device 205c,
j) loading feed into first chromatography device 205a, second chromatography device 205b on hold, washing of the third chromatography device 205c,
k) loading feed into first chromatography device 205a feed device 1, washing of the second chromatography device 205b and loading eluate into third chromatography device 205c.

Each separate chromatography device 505a-c will experience the sequence of process liquids as illustrated in FIG. 3 c-h with for example chromatography device 505a being one step ahead of chromatography device 505b, which in turn is one step ahead of chromatography device 505c.

The method comprises a pre-phase 700 with the steps, not necessarily performed in the below order, of:
- 700:1: priming the first upper feed flow path 220a-1 associated with the first chromatography device 205a with feed liquid provided from the feed source 201a; priming the second upper feed flow path 220a-2 associated with the second chromatography device 205b with feed liquid provided from the feed source 201a; and priming the third upper feed flow path 220a-3 associated with the third chromatography device 205c with feed liquid provided from the feed source 201a, the priming with feed engaging the feed pump 203a;
- 700:2: priming the first upper wash flow path 220b-1 associated with the first chromatography device 205a with wash liquid provided from the wash source 201b; priming the second upper wash flow path 220b-2 associated with the second chromatography device 205b with wash liquid provided from the wash source 201a; and priming the third upper wash flow path 220a-3 associated with the third chromatography device 205c with wash liquid provided from the wash source 201a, the priming with wash engaging the wash pump 203b;
- 700:3: priming the first upper eluent flow path 220c-1 associated with the first chromatography device 205a with eluent liquid provided from the eluent source 201c; priming the second upper eluent flow path 220c-2 associated with the second chromatography device 205b with eluent liquid provided from the eluent source 201c; and priming the third upper eluent flow path 220c-3 associated with the third chromatography device 205c with eluent liquid provided from the eluent source 201c, the priming with eluent engaging the eluent pump 203c.

The pre-phase 700 thereby providing a standby mode with the process liquids loaded at least up to mixing points associated to each chromatography device. The priming of upper flow paths during the pre-phase are preferably performed simultaneously or at least partly overlapping in time, so that, for example the first upper feed flow path 220a-1, first upper wash flow path 220b-1 and the first upper eluent flow path 220c-1 are loaded with respective process fluid at the same time.

Following the pre-phase the preparative chromatography system 500 will shift to an active preparative phase and perform the actual separation process, steps 710-730. The separation process is repeated, or cycled, a predetermined number of times, a predetermined time period or until a predetermined criterion is fulfilled, for example until a predetermined fraction volume has been collected. The order of the steps, the duration of the steps as well as other process parameters are stored in a process file and executed by the control unit, the sub-steps of a main step at least partly overlapping in time, and wherein during a steps of:
- 710:1 Equilibrating or washing the first chromatography device 205a with wash liquid provided from the wash source 201b via the first upper wash flow path 220b-1 by engaging the wash pump 203b, at least one of the following steps are performed:
- 710:2 loading the second chromatography device 205b with feed liquid provided from the feed source 201a via the second upper feed flow path 220a-2 by engaging the feed pump 203a;
- 710:3 performing elution in the third chromatography device 205c by providing eluent liquid from the eluent source 201c via the third upper eluent flow path 220c-3 by engaging the eluent pump 203c, and wherein the eluate is directed to a waste container or to the fraction collector, depending on the content of eluate detected by the monitoring unit 206, or:
- 710:2' loading the third chromatography device 205c with feed liquid provided from the feed source 201a via the third upper feed flow path 220a-3 by engaging the feed pump 203a;
- 710:3' performing elution in the second chromatography device 205c by providing eluent liquid from the eluent source 201c via the second upper eluent flow path 220c-2 by engaging the eluent pump 203c, and wherein the eluate is directed to a waste container or to the fraction collector, depending on the content of eluate detected by the monitoring unit 206, and wherein during a step of
- 720:1 Equilibrating or washing the second chromatography device 205b with wash liquid provided from the wash source 201b via the second upper wash flow path 220b-2 by engaging the wash pump 203b, at least one of the following steps are performed:
- 720:2 loading the first chromatography device 205a with feed liquid provided from the feed source 201 via the first upper feed flow path 220a-1 by engaging the feed pump 203a;
- 720:3 performing elution in the third chromatography device 205c by providing eluent liquid from the eluent source 201c via the third upper eluent flow path 220c-3 by engaging the eluent pump 203c, and wherein the eluate is directed to a waste container or to the fraction collector, depending on the content of eluate detected by the monitoring unit 206, or:
- 720:2' loading the third chromatography device 205c with feed liquid provided from the feed source 201 via the third upper feed flow path 220a-3 by engaging the feed pump 203a;
- 720:3' performing elution in the first chromatography device 205a by providing eluent liquid from the eluent source 201c via the first upper eluent flow path 220c-1 by engaging the eluent pump 203c, and wherein the eluate is directed to a waste container or to the fraction collector, depending on the content of eluate detected by the monitoring unit 206, and wherein during a step of
- 730:1 Equilibrating or washing the third chromatography device 205c with wash liquid provided from the wash source 201b via the third upper wash flow path 220b-3 by engaging the wash pump 203b, at least one of the following steps are performed:
- 720:2 loading the first chromatography device 205a with feed liquid provided from the feed source 201 via the first upper feed flow path 220a-1 by engaging the feed pump 203a;
- 720:3 performing elution in the second chromatography device 205b by providing eluent liquid from the eluent source 201c via the second upper eluent flow path 220c-2 by engaging the eluent pump 203c, and wherein the eluate is directed to a waste container or to the fraction collector, depending on the content of eluate detected by the monitoring unit 206, or:
- 720:2' loading the second chromatography device 205b with feed liquid provided from the feed source 201 via the second upper feed flow path 220a-2 by engaging the feed pump 203a;

720:3' performing elution in the first chromatography device 205a by providing eluent liquid from the eluent source 201c via the first upper eluent flow path 220c-1 by engaging the eluent pump 203c, and wherein the eluate is directed to a waste container or to the fraction collector, depending on the content of eluate detected by the monitoring unit 206.

Four-way valve should be interpreted as a valve, or arrangement of valves, providing at least one inlet and at least three outlets and wherein fluid communication is provided between the inlet and either one of the three outlets by changing the setting/position of the valve.

According to one embodiment of the invention the step of the pre-phase 700 are performed according to:

700b:1: priming a first upper feed flow path 220a-1 associated with a first chromatography device 205a with feed liquid provided from a feed source 201 by setting the first four-way valve 501 to direct the flow to the fourth four-way valve 504 and setting the fourth four-way valve 504 to direct the flow to the first chromatography device 205a; priming a second upper feed flow path 220a-2 associated with a second chromatography device 205b with feed liquid provided from the feed source 201a by setting the first four-way valve 501 to direct the flow to the fifth four-way valve 505 and setting the fifth four-way valve 505 to direct the flow to the second chromatography device 205b; and priming a third upper feed flow path 220a-3 associated with a third chromatography device 205c with feed liquid provided from the feed source 201a by setting the first four-way valve 501 to direct the flow to the sixth four-way valve 506 and setting the sixth four-way valve 506 to direct the flow to the third chromatography device 205c, 700b:2: priming a first upper wash flow path 220b-1 associated with the first chromatography device 205a with wash liquid provided from a wash source 201b by setting the second four-way valve 502 to direct the flow to the fourth four-way valve 504 and setting the fourth four-way valve 504 to direct the flow to the first chromatography device 205a;

priming a second upper wash flow path 220b-2 associated with the second chromatography device 205b with wash liquid provided from the wash source 201a by setting the second four-way valve 502 to direct the flow to the fifth four-way valve 505 and setting the fifth four-way valve 505 to direct the flow to the second chromatography device 205b; and priming a third upper wash flow path 220a-3 associated with the third chromatography device 205c with wash liquid provided from the wash source 201a by setting the second four-way valve 502 to direct the flow to the sixth four-way valve 506 and setting the sixth four-way valve 506 to direct the flow to the third chromatography device 205c;

700b:3: priming a first upper eluent flow path 220c-1 associated with the first chromatography device 205a with eluent liquid provided from a eluent source 201c by setting the third four-way valve 503 to direct the flow to the fourth four-way valve 504 and setting the fourth four-way valve 504 to direct the flow to the first chromatography device 205a;

priming a second upper eluent flow path 220c-2 associated with the second chromatography device 205b with eluent liquid provided from the eluent source 201c by setting the third four-way valve 503 to direct the flow to the fifth four-way valve 505 and setting the fifth four-way valve 505 to direct the flow to the second chromatography device 205b;

and priming a third upper eluent flow path 220c-3 associated with the third chromatography device 205c with eluent liquid provided from the eluent source 201c by setting the third four-way valve 503 to direct the flow to the sixth four-way valve 506 and setting the sixth four-way valve 506 to direct the flow to the third chromatography device 205c;

In the embodiment the steps of the active separation-phase are performed according to steps 710b-730b and wherein during the steps of:

710b:1 Equilibrating or washing the first chromatography device 205a with wash liquid provided from the wash source 201b via the first upper wash flow path 220b-1 by setting the second four-way valve 502 to direct the flow to the fourth four-way valve 504 and setting fourth four-way valve 504 to direct the flow to the first chromatography device 205a, at least one of the following steps are performed:

710b:2 loading the second chromatography device 205b with feed liquid provided from the feed source 201a via the second upper feed flow path 220a-2 by setting the first four-way valve 501 to direct the flow to the fifth four-way valve 505 and setting the fifth four-way valve 505 to direct the flow to the second chromatography device 205b;

710b:3 performing elution in the third chromatography device 205c by providing eluent liquid from the eluent source 201c via the third upper eluent flow path 220c-3 by setting the third four-way valve 503 to direct the flow to the sixth four-way valve 506 and setting the sixth four-way valve 506 to direct the flow to the third chromatography device 205c, and wherein the eluate is directed to a waste container or to the fraction collector, depending on the content of eluate detected by the monitoring unit 206;

or:

710b:2' loading the third chromatography device 205c with feed liquid provided from the feed source 201 via the third upper feed flow path 220a-3 by setting the first four-way valve 501 to direct the flow to the sixth four-way valve 506 and setting the sixth four-way valve 506 to direct the flow to the third chromatography device 205c;

710b:3' performing elution in the second chromatography device 205b by providing eluent liquid from the eluent source 201c via the second upper eluent flow path 220c-2 by setting the third four-way valve 503 to direct the flow to the fifth four-way valve 505 and setting the fifth four-way valve 505 to direct the flow to the second chromatography device 205b, and wherein the eluate is directed to a waste container or to the fraction collector, depending on the content of eluate detected by the monitoring unit 206, and wherein during a step of 720b:1 Equilibrating or washing the second chromatography device 205b with wash liquid provided from the wash source 201b via the second upper wash flow path 220b-2 by setting the second four-way valve 502 to direct the flow to the fifth four-way valve 505 and setting the fifth four-way valve 505 to direct the flow to the second chromatography device 205b, at least one of the following steps are performed:

720b:2 loading the first chromatography device 205a with feed liquid provided from the feed source 201 via the first upper feed flow path 220a-1 by setting the first four-way valve 501 to direct the flow to the fourth four-way valve 504 and setting the fourth four-way valve 504 to direct the flow to the first chromatography device 205*a*;

720*b*:3 performing elution in the third chromatography device 205*c* by providing eluent liquid from the eluent source 201*c* via the third upper eluent flow path 220*c*-3, and wherein the eluate is directed to a waste container or to the fraction collector, depending on the content of eluate detected by the monitoring unit 206, or:

720*b*:2' loading the third chromatography device 205*c* with feed liquid provided from the feed source 201 via the third upper feed flow path 220*a*-3 by setting the first four-way valve 501 to direct the flow to the sixth four-way valve 506 and setting the sixth four-way valve 506 to direct the flow to the third chromatography device 205*c*;

720*b*:3' performing elution in the first chromatography device 205*a* by providing eluent liquid from the eluent source 201*c* via the first upper eluent flow path 220*c*-1 by setting the third four-way valve 503 to direct the flow to the fourth four-way valve 504 and setting the fourth four-way valve 504 to direct the flow to the first chromatography device 205*a*, and wherein the eluate is directed to a waste container or to the fraction collector, depending on the content of eluate detected by the monitoring unit 206, and wherein during a step of

730*b*:1 Equilibrating or washing the third chromatography device 205*c* with wash liquid provided from the wash source 201*b* via the third upper wash flow path 220*b*-3 by setting the second four-way valve 502 to direct the flow to the sixth four-way valve 506 and setting the sixth four-way valve 506 to direct the flow to the third chromatography device 205*c*, at least one of the following steps are performed:

730*b*:2 loading the first chromatography device 205*a* with feed liquid provided from the feed source 201 via the first upper feed flow path 220*a*-1 by setting the first four-way valve 501 to direct the flow to the fourth four-way valve 504 and setting the fourth four-way valve 504 to direct the flow to the first chromatography device 205*a*;

730*b*:3 performing elution in the second chromatography device 205*b* by providing eluent liquid from the eluent source 201*c* via the second upper eluent flow path 220*c*-2 by setting the second four-way valve 502 to direct the flow to the fifth four-way valve 505 and setting the fifth four-way valve 505 to direct the flow to the second chromatography device 205*b*, and wherein the eluate is directed to a waste container or to the fraction collector, depending on the content of eluate detected by the monitoring unit 206, or:

730*b*:2' loading the second chromatography device 205*b* with feed liquid provided from the feed source 201 via the second upper feed flow path 220*a*-2 by setting the first four-way valve 501 to direct the flow to the fifth four-way valve 505 and setting the fifth four-way valve 505 to direct the flow to the second chromatography device 205*b*;

730*b*:3' performing elution in the first chromatography device 205*c* by providing eluent liquid from the eluent source 201*c* via the first upper eluent flow path 220*c*-1 by setting the third four-way valve 503 to direct the flow to the fourth four-way valve 504 and setting the fourth four-way valve 504 to direct the flow to the first chromatography device 205*a*, and wherein the eluate is directed to a waste container or to the fraction collector, depending on the content of eluate detected by the monitoring unit 206.

Figures 8A, 8B:
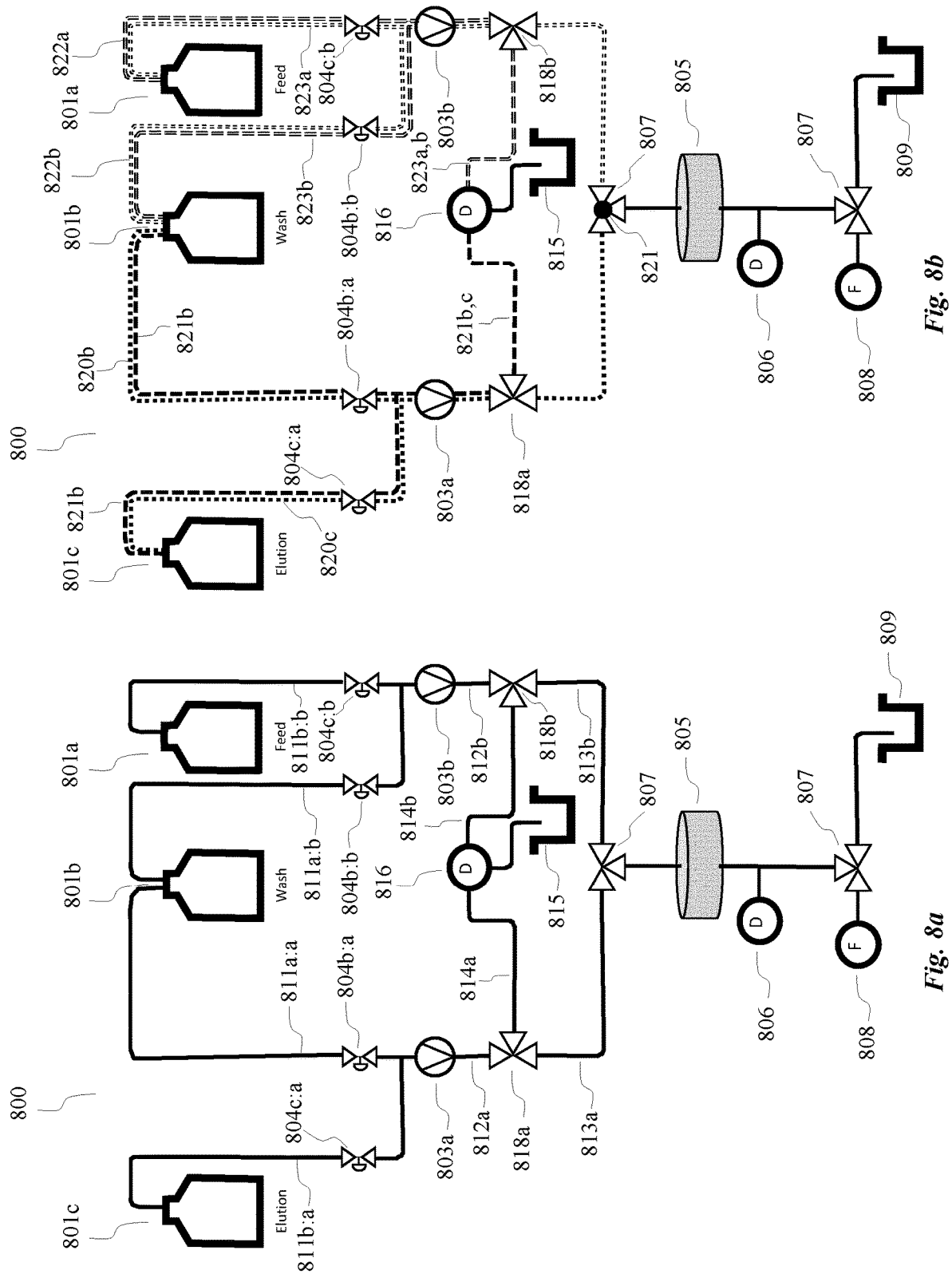
FIG. 8 is a schematic illustration of one embodiment of the preparative chromatography system according to the present invention.

According to one embodiment of the invention schematically illustrated in FIG. 8*a*-*b*, the preparative chromatography system 800 is configured for two pumps being operated in parallel. The preparative chromatography system 800 comprises a feed source 801*a*, a wash source 801*b* and an eluent source 801*c* for providing the process liquids, feed, wash and eluent. The preparative chromatography system 800 further comprises a first pump 803*a* and a second pump 803*b* which are arranged to operate in a parallel arrangement, which will be further discussed below. The first pump 803*a* is via tubing arrangements 811*a*:*a* and wash source valve 804*b*:*a* connected to wash source 801*b*, and via tubing arrangements 811*b*:*a* and eluent source valve 804*c*:*a* connected to the eluent source 801*c*. The second pump 803*b* are via first tubing arrangements 811*a*:*b* and wash source valve 804*b*:*b* connected to wash source 801*b*, and via first tubing arrangements 811*b*:*b* and feed source valve 804*c*:*b* connected to the feed source 801*a*. The source valves 804*a*,*b* are typically control valves. Alternatively the system 800 is provided with two sets of process liquid sources (not shown), each comprising a feed source, a wash source and an eluent source, so that each of the first and second pump is connected to a separate set. The first pump 803*a* and the second pump 803*b* are downstream via second tubing arrangement 812*a*, 812*b* connected to a first upper valve 818*a* and a second upper valve 818*b*, respectively, which are via third tubing arrangements 813*a*, 813*b* connected to a common valve 870, a four-way valve, and via fourth tubing arrangements 814*a*, 814*bb* connected to a first waste container 815, respectively. The first upper valve 818*a* and the second upper valve 818*b* are typically three-way valves (one inlet, two outlets) and can each be set to direct the flow to either the waste container 815 or to the common valve 870. The common valve 870 is connected to a chromatography device 805 and arranged to direct the flow from the first or the second upper valve 818*a*-*b* to the chromatography device 805 and close to the other one of the upper valves 818*a*-*b*. Thereby process liquid is prevented from entering into the other of the tubing arrangement 813*a*, 813*b* that is not presently used for directing a flow to the chromatography device 805. Alternatively, a manifold is used instead of the common valve 870. However, such configuration should only be used if a backflow in the momentarily "non-used" tubing arrangement could be accepted. Alternatively, a manifold with a check valve arrangement on the inlets could be utilized. Alternatively, the functionality of the first upper valve 818*a*, the second upper valve 818*b* and the common valve 870 could be provided with one appropriately arranged large multi-way valve. The chromatography device 805 is connected to a monitoring unit 806 in connection with a lower valve 807 which is arranged to guide a flow to either a fraction collector 808 or a second waste container 809. The first and second waste container may be the same.

As previously pointed out, the use of three process liquids represents an illustrative example of a minimal configuration of a preparative chromatography system 800, whereas a typical configuration utilizes a larger number of process liquids. The skilled person will have no problem, following the design principles set out in the above embodiment to modify a configuration to handle a larger number of process liquids. Other modifications, such as, but not limited to, providing loops and gradient technology as previously discussed may also be utilized in the preparative chromatography system 800.

According to one embodiment preparative chromatography system 800 comprises a plurality of wash or buffer liquids and each of the first pump 803a and the second pump 803b are arranged to handle a plurality of wash liquids provided in different liquid sources. According to one embodiment only one of the first pump 803a and the second pump 803b is connected to the feed liquid source 801a and the other pump is connected to the elution source 801c.

Illustrated in FIG. 8b is a general embodiment according to the same concept as described with reference to FIG. 8a. The preparative chromatography system 800 according to the embodiment provides separate and individual upper flow paths from process liquid sources via respective first pump 803a and the second pump 803b to the common valve 870. The individual upper flow paths end at a mixing point 821 defined as the first location in the flow direction there a process liquid which has passed the first pump 803a will meet and mix with a process liquid that has passed the second pump 803b. The mixing point 821 is located within the common valve 870. In addition, separate flow paths associated with the first pump 803a and the second pump 803b ends in the first waste container 815. First chromatography flow paths 820b, 820c controlled by and which passes the first pump 803a from the respective process liquid source, the wash source 801b and the eluent source 801c to the common valve 870 are indicated with dotted lines. First waste flow paths 821b, 821c from the respective process liquid source, the wash source 801b and the eluent source 801c to the first waste container 815 which is controlled by and passes the first pump 803a are indicated with dashed lines. Second chromatography flow paths 822a, 822b from the respective process liquid source, the feed source 801a and the wash source 801b, to the common valve 870 which is controlled by and which passes the second pump 803b are indicated with dotted double lines. Second waste flow paths 823a, 823b from the respective process liquid source, the feed source 801a and the wash source 801b, to the waste container 815 which is controlled by and which passes the second pump 803a are indicated with dashed double lines.

According to one embodiment of the invention the preparative chromatography system 800 is provided with one or more upper monitoring units 816 provided in the waste flow paths in-between the first upper valve 818a, the second upper valve 818b and the first waste container 815. The upper monitoring units 816 may be arranged to provide a watch-function to indicated that the flow path that is currently primed with one process liquid is sufficiently primed and ready for the change to a subsequent process liquid.

The embodiment of the preparative chromatography system 800 facilitates and is operated so that while the first pump 803a is engaged in providing a process liquid to the chromatography device 805, the second pump 803b is engaged in providing a process liquid to the waste container 815 and thereby priming at least part of its associated chromatography flow path, and vice versa. According to one embodiment a chromatography device sequence of process liquids that are to be run through the chromatography device 805 has been established and from the chromatography device sequence, separate sequences for the first pump 803a and the second pump 803b and the flow paths associated to them, may be generated. According to the sequence in one step the first pump 803a provides a process liquid to the chromatography device 805, for example wash liquid, at least partly simultaneously the second pump 803b primes its associated flow path with the process liquid, for example feed liquid, that is according to the chromatography device sequence the next process liquid to be provided to the chromatography device 805. In the next step the second pump 803b provides the process liquid that in the previous step had been used for priming (following the example, feed liquid) to the chromatography device 805, and at least partly simultaneously the first pump 803a primes with the next process liquid according to the chromatography device sequence. As in the current example the next process liquid to be provided to the chromatography device would be wash liquid, which illustrate that the individual pumps may continue to pump the same process liquid according to their individual sequences, while the process liquid provided to the chromatography device 805 will shift according to the chromatography device sequence. This will be further illustrated in describing the method of operation according to the embodiments of the invention described below.

Figure 9:
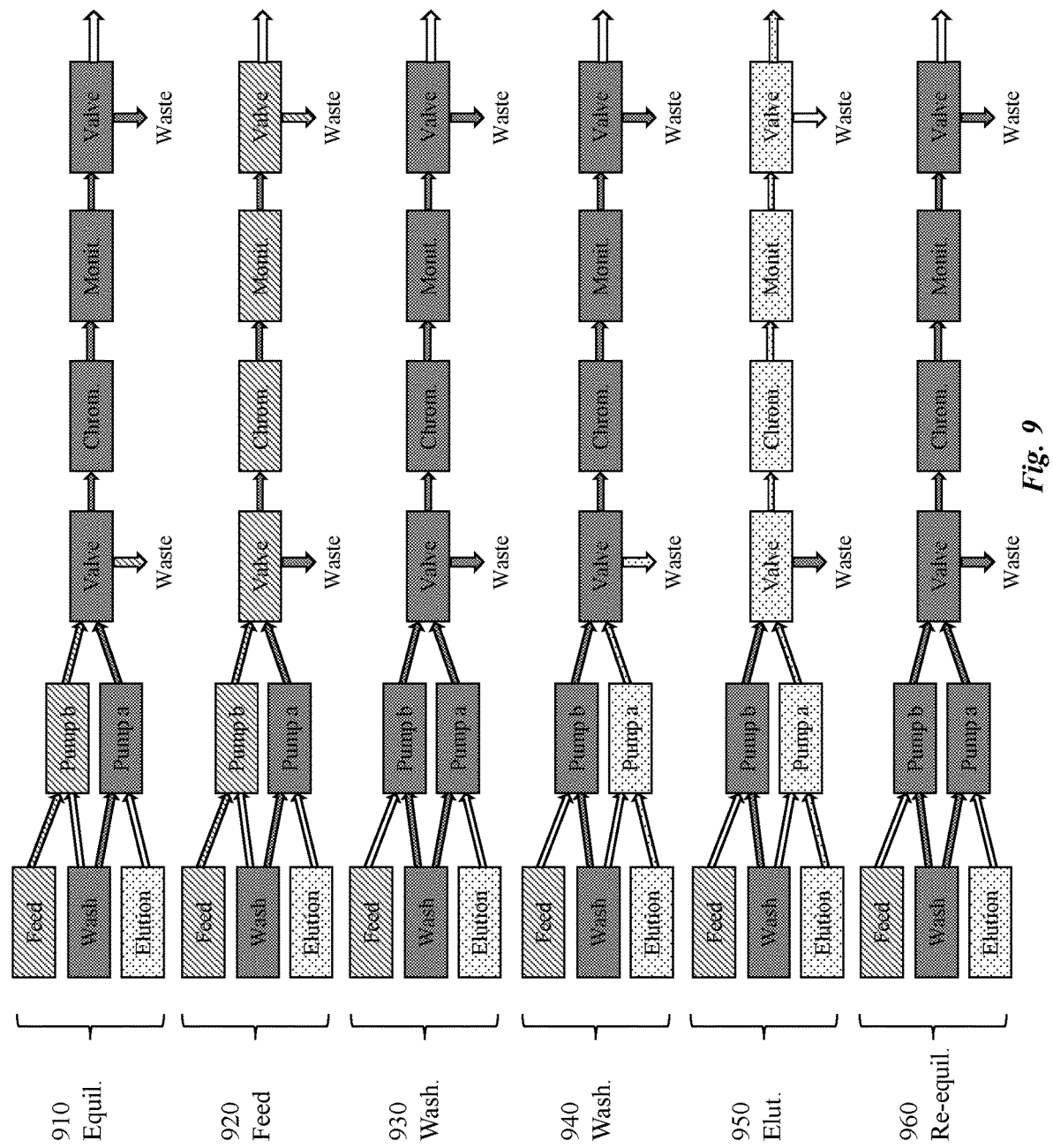
FIG. 9 is schematic illustration of steps of the method according to one embodiment of the present invention.

According to one embodiment the preparative chromatography system 800 comprises two or more chromatography devices 805 and the common valve 870 is a multiple-way valve One embodiment of the method according to the invention may utilize the preparative chromatography system 800 with a tandem pump configuration and will be described with references to the flow path illustrations of FIG. 9. Reference will be made to the preparative chromatography system 800 described with references to FIG. 8a-b as an illustrative, but not limiting, example of a preparative chromatography system suitable to execute the method according to this embodiment.

Focusing on the flow through the chromatography device 805 the method results in, as the embodiment described above in a sequence comprising of equilibration, feed loading, washing, eluting, and re-equilibration. This separation process is repeated, or cycled, a predetermined number of times, a predetermined time period or until a predetermined criterion is fulfilled, for example until a predetermined fraction volume has been collected. The order of the steps, the duration of the steps as well as other process parameters are stored in a process file and executed by the control unit.

The method according to the embodiment comprises the steps of:

910: Equilibrating the chromatography device 805 by engaging the first pump 803a to provide wash liquid from the wash source 801b via the first wash chromatography flow path 820b to the chromatography device 805 and at least partly simultaneously priming at least the second pump 803b with feed liquid by engaging the second pump 803b to provide feed liquid from the feed source 801a to the first waste container 815 via the second feed waste flow path 823a;

920: Loading feed to the chromatography device 805 by engaging the second pump 803b to provide feed liquid from the feed source 801a via the second feed chromatography flow path 822a to the chromatography device 805 and at least partly simultaneously priming at least the first pump 803a with wash liquid by engaging the first pump 803a to provide wash liquid from the wash source 801b to the first waste container 815 via the first wash waste flow path 821b;

930: Washing the chromatography device 805 by engaging the first pump 803a to provide wash liquid from the wash source 801b via the first wash chromatography flow path 820b to the chromatography device 805 and at least partly simultaneously priming at least the second pump 803b with wash liquid by engaging the second pump 803*b* to provide wash liquid from the wash source 801*b* to the first waste container 815 via the second wash waste flow path 823*b*;

940: Continuing washing the chromatography device 805 by engaging the second pump 803*b* to provide wash liquid from the wash source 801*b* via the second wash chromatography flow path 821*b* to the chromatography device 805 and at least partly simultaneously priming at least the first pump 803*a* with eluent liquid by engaging the first pump 803*a* to provide eluent liquid from the eluent source 801*c* to the first waste container 815 via the first eluent waste flow path 821*c*;

950: Performing elution in the chromatography device 805 by engaging the first pump 803*a* to provide eluent liquid from the eluent source 801*c* via the first eluent chromatography flow path 820*c* to the chromatography device 805 and at least partly simultaneously priming at least the second pump 803*b* with wash liquid by engaging the second pump 803*b* to provide wash liquid from the wash source 801*b* to the first waste container 815 via the second wash waste flow path 823*b*;

960: Re-equilibrating the chromatography device 805 by engaging the second pump 803*b* to provide wash liquid from the wash source 801*b* via the second wash chromatography flow path 821*b* to the chromatography device 805 and at least partly simultaneously priming at least the first pump 803*a* with wash liquid by engaging the first pump 803*a* to provide wash liquid from the wash source 801*b* to the first waste container 815 via the first wash waste flow path 821*b*.

During the step 950 of performing elution, the eluate from the chromatography device 805 is by the lower valve 807 directed to the fraction collector 808 or to the second waste container 809 based on the content of the eluate, which is determined from the signal output from the monitoring unit 806. During all other of the above steps, step 910, 920, 930, 940, 960 the process liquid, or typically mixed process liquids, outputted from the chromatography device 805 is by the lower valve 807 directed to the second waste container 809.

The duration of the priming with the process liquids in the flow paths upstream of the chromatography device 805 in the steps 910-960 is determined either from the output from the upper monitoring unit 816 or are pre-determined time periods according to the process scheme. The duration of washing, equilibrating, re-equilibrating and loading feed to the chromatography device 805, is preferable based on the output from the monitoring unit 806 (watch-function). Alternatively, the durations are pre-determinately given by the process scheme.

The preparative chromatography system 800 may be adapted to utilize a plurality of chromatography devices in the manner done in prior art systems.

One embodiment of the method utilizing the tandem configuration of the preparative chromatography system 800 comprises the steps of:

910': Equilibrating the chromatography device 805 by:
opening wash source valve 804*b:a* to connect between the wash source 801*b* and the first pump 803 *a;*
setting the first upper valve 818*a* to connect to the common valve 870;
setting the common valve 870 to connect the first upper valve 818*a* to the chromatography device 805;
setting the lower valve 807 to connect to the second waste container 809;
engaging the first pump 803*a* to provide wash liquid from the wash source 801*b* to and through the chromatography device 805, and at least partly simultaneously priming at least the second pump 803*b* with feed liquid by:
closing wash source valve 804*b:b* if open from previous cycle;
opening feed source valve 804*c:b* to connect between the feed source 801*c* and the second pump 803*b;*
setting the second upper valve 818*b* to connect to the first waste container 815;
engaging the second pump 803*b* to provide feed liquid from the feed source 801*a* to the first waste container 815.

920': Loading feed to the chromatography device 805 by:
setting the second upper valve 818*b* to connect to the common valve 870;
setting the common valve 870 to connect the second upper valve 818*a* to the chromatography device 805;
engaging the second pump 803*b* to provide feed liquid from the feed source 801*a* to and through the chromatography device 805, and at least partly simultaneously priming at least the first pump 803*a* with wash liquid by:
setting the first upper valve 818*b* to connect to the first waste container 815;
engaging the first pump 803*a* to provide wash liquid from the wash source 801*b* to the first waste container 815.

930': Washing the chromatography device 805 by:
setting the first upper valve 818*a* to connect to the common valve 870;
setting the common valve 870 to connect the first upper valve 818*a* to the chromatography device 805;
engaging the first pump 803*a* to provide wash liquid from the wash source 801*b* to the chromatography device 805,
and at least partly simultaneously priming at least the second pump 803*b* with wash liquid by:
closing feed source valve 804*c:b;*
opening wash source valve 804*b:b* to connect between the wash source 801*b* and the second pump 803*b;*
setting the second upper valve 818*b* to connect to the first waste container 815;
engaging the second pump 803*b* to provide wash liquid from the wash source 801*b* to the first waste container 815.

940': Continuing washing the chromatography device 805 by:
setting the second upper valve 818*b* to connect to the common valve 870;
setting the common valve 870 to connect the second upper valve 818*a* to the chromatography device 805;
engaging the second pump 803*b* to provide wash liquid from the wash source 801*b* to the chromatography device 805,
and at least partly simultaneously priming at least the first pump 803*a* with eluent liquid by:
closing wash source valve 804*b:a;*
opening eluent source valve 804*c:a* to connect between the eluent source 801*c* and the first pump 803 *a;*
setting the first upper valve 818*a* to connect to the first waste container 815;
engaging the first pump 803*a* to provide eluent liquid from the eluent source 801*c* to the first waste container 815.

950': Performing elution in the chromatography device 805 by:

setting the first upper valve 818a to connect to the common valve 870;

setting the common valve 870 to connect the first upper valve 818a to the chromatography device 805;

engaging the first pump 803a to provide eluent liquid from the eluent source 801c to the chromatography device 805;

based on the output from the monitoring unit indicative of the content of eluate received from the chromatography device 805, setting the lower valve 807 to connect to the fraction collector 808 during passing of a specific eluate content, and returning the setting the lower valve 807 to connect to second waste container 809;

and at least partly simultaneously priming at least the second pump 803b with wash liquid by:

setting the second upper valve 818b to connect to the first waste container 815;

engaging the second pump 803b to provide wash liquid from the wash source 801b to the first waste container 815.

960': Re-equilibrating the chromatography device 805 by:

setting the second upper valve 818b to connect to the common valve 870;

setting the common valve 870 to connect the second upper valve 818a to the chromatography device 805;

engaging the second pump 803b to provide wash liquid from the wash source 801b to the chromatography device 805, closing wash source valve 804b:b; and at least partly simultaneously priming at least the first pump 803a with wash liquid by:

closing eluent source valve 804c:a;

opening wash source valve 804b:a to connect between the wash source 801b and the first pump 803a;

setting the first upper valve 818a to connect to the first waste container 815;

engaging the first pump 803a to provide wash liquid from the wash source 801b to the first waste container 815.

Figure 10A:
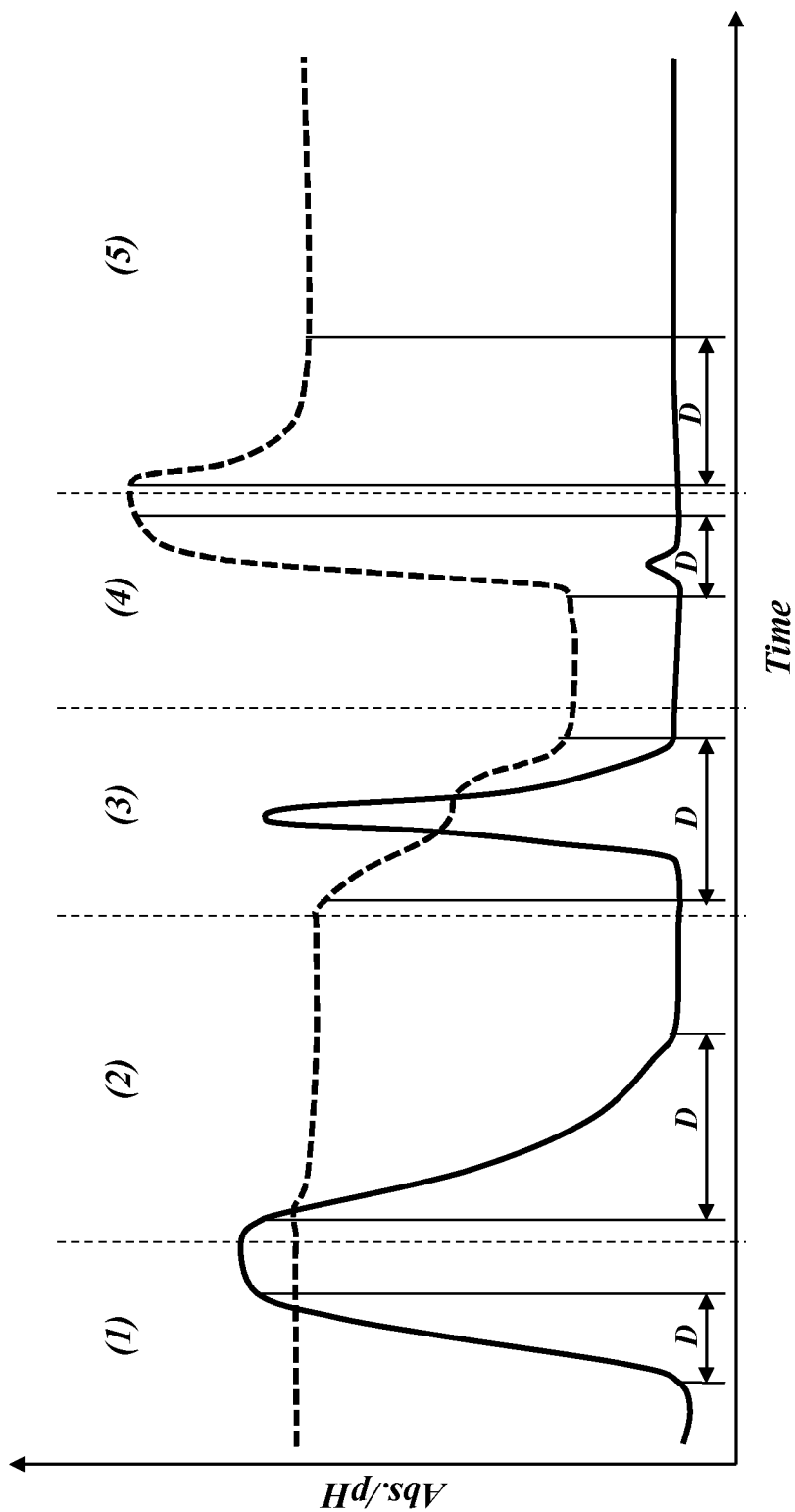

The preparative chromatography system configurations and the methods that can be utilized using these systems, according to the embodiments described above minimizes the hold-up volume and reduces the time required to change from one process liquid to another. FIGS. 10a-b are schematic chromatograms (arbitrary units) of UV absorbance (solid lines) and pH (dashed lines) vs. time during one process cycle for: a) a typical prior art system and b) the system according to the embodiment described with reference to FIG. 2a-h operated according the method described with reference to FIGS. 3a-h. The process cycle comprises the phases load (1), wash (2), elution (3), wash/cleaning-in-place (4) and re-equilibration (5). Indicated in the FIG. 10a are the dispersion periods, D, surrounding the peaks and causing severe broadening. Comparing with FIG. 10b the dispersion is significantly smaller, leading to both improved detection/separation and a significantly reduced time for one process cycle to be completed.

Figure 11:
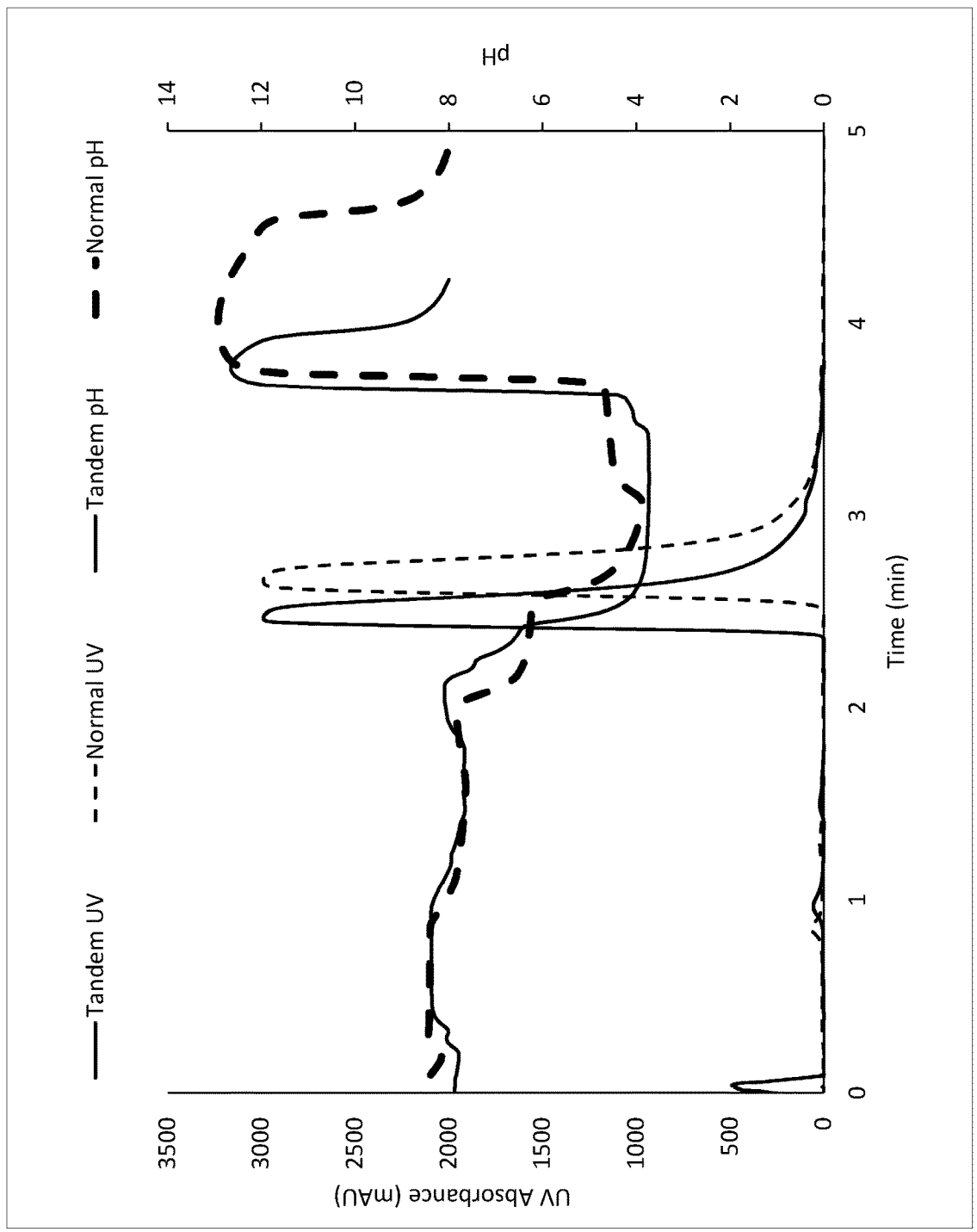
FIG. 11 is a chromatogram obtained using the preparative chromatography system method according to one embodiment according to the present invention.

FIG. 11 is a chromatogram showing UV absorbance and pH vs. time using a preparative chromatography system and method of the embodiment described with reference to FIGS. 8-10 (solid lines) compared with a traditional system (dashed lines). It is shown how drawbacks of the traditional system, i.e. diffuse wash buffer transitions, not reaching the correct pH quick enough during the wash, and the slow re-equilibration after CiP (Cleaning-in-Place phase) wash step, all are mitigated with the system and method according to the invention.

In terms of volume, the present invention system will save 10 column volumes on each run. In terms of time savings, about 0.8 minutes will be saved per sub-run, which will amount to 2.6 hours over 200 cycles (this represents the lifetime of the column) and a reduction in run time of 15%. See table 1 below, wherein "Tandem" refers to the preparative chromatography system 800 described with reference to FIGS. 8a-b and 9.

TABLE 1

| Single run | Tandem | Normal | Savings: |
|---|---|---|---|
| CV | 30,78 | 38,987 | |
| ml | 123,13 | 155,95 | |
| min | 4,23 | 5 | 0.77 minutes |

| 200 runs | Tandem | Normal | |
|---|---|---|---|
| CV | 6156 | 7797,4 | |
| ml | 24626 | 31190 | |
| min | 846 | 1000 | 154 minutes |

Various embodiments of the present invention may incorporate fiber-based chromatography media, and be optimized for efficiency of operation therewith. For example, various embodiments of the present invention may include one or more Fibro™/Fibro PrismA™ etc. chromatography components as are commercially available from Cytiva™ Life Sciences.

Various embodiments of the present invention may thus be provided that have a decreased dead volume and/or buffer transition between each processing step as compared to prior art devices/systems. Certain embodiments of the invention are thus faster to operate and/or have an improved maximum theoretical operational efficiency than known devices/systems. For example, various embodiments may be provided in which convective flow is provided so as to reduce or avoid time delays that occur with mainly diffusion-based devices/systems. Furthermore, various embodiments of the present invention can be provided having a reduced resin volume compared to known devices/systems. Certain embodiments may additionally, or alternatively, provide multiple capture/per elute step(s) cyclic processing therein (for example, 200×capture/elute cyclic processing may be employed).

For example, in one known chromatography system a default setting for a delay volume therein is 8 ml. However, in practice, the delay volume may be 4-6 ml depending on which mixer is used etc. By using various embodiment of the present invention, however, the delay volume (e.g. between a column/injection valve to a chromatography unit, such as a separation column) may advantageously be reduced to only 0.5-1.0 ml.

In a known chromatography system incorporating a fiber-based chromatography medium, a membrane volume (mV) therein provides a typical buffer transition for a 0.4 ml component (with a 4 ml delay volume) of 10-15 mV. In contrast, various embodiments of the present invention enable such a buffer transition to be reduced to only 3-6 mV.

The embodiments described above are to be understood as illustrative examples of the system and method of the present invention. It will be understood that those skilled in the art that various modifications, combinations and changes may be made to the embodiments. In particular, different part solutions in the different embodiments can be combined in other configurations, where technically possible.

The invention claimed is:

1. A method for performing preparative chromatography operating a preparative chromatography system, wherein the preparative chromatography system is configured to operate with at least a first process liquid and a second process liquid, and wherein the preparative chromatography system comprises:
   at least one chromatography device,
   a first process liquid source,
   a second process liquid source,
   a first upper flow path from the first process liquid source to the chromatography device,
   a second upper flow path from the second process liquid source to the chromatography device,
   a first pump in the first upper flow path configured to provide the first process liquid to the chromatography device, and
   a second pump in the second upper flow path configured to provide the second process liquid to the chromatography device,
   wherein the first upper flow path is joined with the second upper flow path at a mixing point, the mixing point being downstream of the first and second pump and upstream of the chromatography device, and
   wherein the method comprises:
      utilizing the first pump to prime the first upper flow path with the first process liquid, and after the priming, utilizing the first pump to provide the first process liquid to the chromatography device; and
      utilizing the second pump to prime the second upper flow path with the second process liquid, and after the priming, utilizing the second pump to provide the second process liquid to the chromatography device;
   wherein the chromatography device is a membrane chromatography device.

2. The method according to claim 1, wherein the preparative chromatography system is configured to operate with a feed liquid, a wash liquid and an eluent liquid, and the preparative chromatography system comprises:
   a feed source,
   a wash source,
   an eluent source,
   an upper feed flow path from the feed source to the chromatography device,
   an upper wash flow path from the wash source to the chromatography device, and
   an upper eluent flow path from the eluent source to the chromatography device,
   wherein the method for performing preparative chromatography comprises a pre-phase comprising:
      priming the upper feed flow path with feed liquid from the feed source;
      priming the upper wash flow path with wash liquid from the wash source; and
      priming the upper eluent flow path with eluent liquid from a eluent source; and
   wherein the method for performing preparative chromatography comprises an active preparative phase comprising a process cycle comprising:
      equilibrating the chromatography device by transferring wash liquid from the wash source to the chromatography device via the upper wash flow path;
      transferring feed liquid to the chromatography device by transferring feed liquid from the wash source to the chromatography device via the upper feed flow path;
      washing the chromatography device by transferring wash liquid from the wash source to the chromatography device via the upper wash flow path;
      performing elution in the chromatography device by transferring eluent liquid transferred from the eluent source to the chromatography device via the upper eluent flow path; and
      re-equilibrating the chromatography device by providing wash liquid from the wash source to the chromatography device via the upper wash flow path.

3. The method according to claim 1, wherein the preparative chromatography system comprises:
   a feed pump positioned in the upper feed flow path and configured to transfer the feed liquid to the chromatography device and an upper feed valve positioned downstream of the feed pump in the upper feed flow path,
   a wash pump positioned in the upper wash flow path and configured to transfer the wash liquid to the chromatography device and an upper wash valve positioned downstream of the wash pump in the wash flow path,
   an eluent pump positioned in the upper eluent flow path and configured to transfer eluent liquid to the chromatography device and an upper eluent valve positioned downstream of the eluent pump in the eluent flow path,
   a monitoring unit positioned downstream of the chromatography device, and
   a lower valve positioned downstream of the monitoring unit configured to connect to either a waste container or a fraction collector,
   wherein the pre-phase of the method for performing preparative chromatography comprises:
      priming the upper feed flow path by controlling the feed pump and upper feed valve to transfer the feed liquid to the feed flow path, where during this feed priming period the upper wash valve and the upper eluent valve are closed;
      priming the upper wash flow path by controlling the wash pump and upper wash valve to transfer wash liquid to the wash flow path, where during this wash priming period the upper feed valve and the upper eluent valve are closed; and
      priming the upper eluent flow path by controlling the eluent pump and upper eluent valve to transfer eluent liquid to the eluent flow path, where during this eluent priming period the upper wash valve and the upper feed valve are closed; and
   wherein the active preparative mode of the method for performing preparative chromatography comprises:
      equilibrating the chromatography device by controlling the wash pump and upper wash valve to transfer wash liquid to and through the chromatography device, where the lower valve is set to the waste container, and where during this step the upper feed valve and the upper eluent valve are closed;
      transferring feed liquid to the chromatography device by controlling the feed pump and upper feed valve to transfer feed liquid to and through the chromatography device, where the lower valve is set to the waste container, and where during this step the upper wash valve and the upper eluent valve are closed;
      washing the chromatography device by controlling the wash pump and upper wash valve to transfer wash liquid to and through the chromatography device, where the lower valve is set to the waste container, and where during this step the upper feed valve and the upper eluent valve are closed;

performing elution in the chromatography device by controlling the eluent pump and upper eluent valve to transfer eluent liquid to and through the chromatography device, where the lower valve is set to either the waste container or to the fraction collector, the setting depending on the content of eluate detected by the monitoring unit, and where during this step the upper wash valve and the upper feed valve are closed; and re-equilibrating the chromatography device by controlling the wash pump and upper wash valve to transfer wash liquid to and through the chromatography device, where the lower valve is set to the waste container, and where during this step the upper feed valve and the upper eluent valve are closed.

4. The method according to claim 1, wherein the preparative chromatography system is configured to operate with feed liquid, wash liquid and eluent liquid, wherein the preparative chromatography system comprises:

a feed source connected to a feed pump, a wash source connected to wash pump and an eluent source connected to eluent pump;

a first chromatography device in connection with a first monitoring unit, a second chromatography device in connection with a second monitoring unit and a third chromatography device in connection with a third monitoring unit;

a first upper feed flow path provided from the feed source to the first chromatography device, a second upper feed flow path provided from the feed source to the second chromatography device and a third upper feed flow path provided from the feed source to the third chromatography device, wherein the upper feed flow paths are bifurcated downstream of the feed pump;

a first upper wash flow path provided from the wash source to the first chromatography device, a second upper wash flow path provided from the wash source to the second chromatography device and a third upper wash flow path provided from the wash source to the third chromatography device, wherein the upper wash flow paths are bifurcated downstream of the wash pump;

a first upper eluent flow path provided from the eluent source to the first chromatography device, a second upper eluent flow path provided from the eluent source to the second chromatography device and a third upper eluent flow path provided from the eluent source to the third chromatography device, wherein the upper eluent flow paths are bifurcated downstream of the eluent pump;

wherein the method for performing preparative chromatography comprises an active preparative phase comprising at least partly simultaneously performing:

equilibrating or washing one of the first, second or third chromatography devices with wash liquid provided from the wash source via one of first upper wash flow paths by engaging the wash pump, filling another of the first, second or third chromatography devices with feed liquid transferred from the feed source via one of the upper feed flow paths by engaging the feed pump; and performing eluation in the remaining of the first, second or third chromatography devices by transferring eluent liquid from the eluent source via the one of the upper eluent flow path by engaging the eluent pump, wherein the eluate is directed to a waste container or to a fraction collector, depending on the content of eluate detected by the monitoring unit.

5. The method according to claim 4, wherein the method for performing preparative chromatography comprises a pre-phase comprising:

priming the first upper feed flow path associated with the first chromatography device with feed liquid transferred from the feed source;

priming the second upper feed flow path associated with the second chromatography device with feed liquid transferred from the feed source; and priming the third upper feed flow path associated with the third chromatography device with feed liquid transferred from the feed source, wherein the feed pump is engaged;

priming the first upper wash flow path associated with the first chromatography device with wash liquid provided from the wash source;

priming the second upper wash flow path associated with the second chromatography device with wash liquid provided from the wash source;

priming the third upper wash flow path associated with the third chromatography device with wash liquid provided from the wash source, wherein the wash pump is engaged;

priming the first upper eluent flow path associated with the first chromatography device with eluent liquid provided from the eluent source;

priming the second upper eluent flow path associated with the second chromatography device with eluent liquid provided from the eluent source; and priming the third upper eluent flow path associated with the third chromatography device with eluent liquid provided from the eluent source, wherein the eluent pump is engaged.

6. The method according to any preceding claim, wherein the method for performing preparative comprises an active preparative phase comprising:

equilibrating or washing the first chromatography device with wash liquid from the wash source via the first upper wash flow path by engaging the wash pump, and during which step at least one of the following steps are performed:

filling the second chromatography device with feed liquid transferred from the feed source via the second upper feed flow path by the feed pump;

performing elution in the third chromatography device by transferring eluent liquid from the eluent source via the third upper eluent flow path by the eluent pump, and wherein the eluate is directed to a waste container or to a fraction collector, depending on the content of eluate detected by the monitoring unit;

filling the third chromatography device with feed liquid transferred from the feed source via the third upper feed flow path by the feed pump;

performing elution in the second chromatography device by transferring eluent liquid from the eluent source via the second upper eluent flow path by the eluent pump, wherein the eluate is directed to a waste container or to the fraction collector, depending on the content of eluate detected by the monitoring unit, and equilibrating or washing the second chromatography device with wash liquid transferred from the wash source via the second upper wash flow path by the wash pump, during which at least one of the following steps are performed:

filling the first chromatography device with feed liquid transferred from the feed source via the first upper feed flow path by the feed pump;

performing elution in the third chromatography device by transferring eluent liquid from the eluent source via the third upper eluent flow path by the eluent pump, wherein the eluate is directed to a waste container or to the fraction collector, depending on the content of eluate detected by the monitoring unit, filling the third chromatography device with feed liquid transferred from the feed source via the third upper feed flow path by the feed pump;

performing elution in the first chromatography device by transferring eluent liquid from the eluent source via the first upper eluent flow path by the eluent pump, wherein the eluate is directed to a waste container or to the fraction collector, depending on the content of eluate detected by the monitoring unit, and equilibrating or washing the third chromatography device with wash liquid transferred from the wash source via the third upper wash flow path by the wash pump, and during which step at least one of the following steps are performed:

filling the first chromatography device with feed liquid transferred from the feed source via the first upper feed flow path by the feed pump;

performing elution in the second chromatography device by transferring eluent liquid from the eluent source via the second upper eluent flow path by the eluent pump, wherein the eluate is directed to a waste container or to the fraction collector, depending on the content of eluate detected by the monitoring unit, filling the second chromatography device with feed liquid transferred from the feed source via the second upper feed flow path by the feed pump;

performing elution in the first chromatography device by transferring eluent liquid from the eluent source via the first upper eluent flow path by the eluent pump, wherein the eluate is directed to a waste container or to the fraction collector, depending on the content of eluate detected by the monitoring unit.

7. The method according to claim 6, wherein the preparative chromatography system is arranged according to:

the feed pump is connected to a first four-way valve, the wash pump is connected to a second four-way valve and the eluent pump is connected to a third four-way valve;

the first four-way valve is connected to a fourth four-way valve, a fifth four-way valve and a sixth four-way valve;

the second four-way valve is connected to the fourth four-way valve, the fifth four-way valve and the sixth four-way valve;

the third four-way valve is connected to the fourth four-way valve, the fifth four-way valve and the sixth four-way valve;

the fourth four-way valve is connected to the first chromatography device;

the fifth four-way valve is connected to the second chromatography device; and the sixth four-way valve is connected to the third chromatography device, wherein in the steps of the pre-phase and/or the preparative phase:

feed liquid is provided from the feed source to:

the first chromatography device via the first upper feed flow path by setting the first four-way valve to direct the flow to the fourth four-way valve and setting the fourth four-way valve to direct the flow to the first chromatography device;

the second chromatography device via the second upper feed flow path by setting the first four-way valve to direct the flow to the fifth four-way valve and setting the fifth four-way valve to direct the flow to the second chromatography device; and the third chromatography device via the third upper feed flow path by setting the first four-way valve to direct the flow to the sixth four-way valve and setting the sixth four-way valve to direct the flow to the third chromatography device, wherein wash liquid is transferred from the wash source to:

the first chromatography device via the first upper wash flow path by setting the second four-way valve to direct the flow to the fourth four-way valve and setting fourth four-way valve to direct the flow to the first chromatography device;

the second chromatography device via the second upper wash flow path by setting the second four-way valve to direct the flow to the fifth four-way valve and setting the fifth four-way valve to direct the flow to the second chromatography device; and the third chromatography device via the third upper wash flow path by setting the second four-way valve to direct the flow to the sixth four-way valve and setting the sixth four-way valve to direct the flow to the third chromatography device, and wherein eluent liquid is provided from the eluent source to:

the first chromatography device via the first upper eluent flow path by setting the third four-way valve to direct the flow to the fourth four-way valve and setting the fourth four-way valve to direct the flow to the first chromatography device;

the second chromatography device via the second upper eluent flow path by setting the third four-way valve to direct the flow to the fifth four-way valve and setting the fifth four-way valve to direct the flow to the second chromatography device; and the third chromatography device via the third upper eluent flow path by setting the third four-way valve to direct the flow to the sixth four-way valve and setting the sixth four-way valve to direct the flow to the third chromatography device.

8. The method according to claim 1, wherein the preparative chromatography system is configured to operate with feed liquid, wash liquid and eluent liquid, and wherein the preparative chromatography system comprises:

a feed source, a wash source and an eluent source;

a first pump, a second pump, a first waste container and a common valve connected to the chromatography device, wherein the preparative chromatography system provides first chromatography flow paths which pass the first pump from at least one of the process liquid sources to the common valve, and second chromatography flow paths which pass the second pump from at least one of the process liquid sources to the common valve;

first waste flow paths which pass the first pump from at least one of the process liquid sources to the first waste container, and second waste flow paths which pass the second pump from least one of the process liquid sources to the common valve;

and wherein, in the steps of the method the first pump transfers a process liquid to the chromatography device, and the second pump is at least partly simultaneously engaged in providing a process liquid to the waste container via one of the second waste flow paths.

9. The method according to claim 8, wherein a predetermined chromatography device sequence defines the order of process liquids that are to be run through the chromatography device, and in one step one of the first pump and the second pump transfers a process liquid to the chromatography device, and least partly simultaneously the other of the first pump and the second pump primes its associated flow path with the process liquid that according to the chromatography device sequence the next process liquid to be transferred to the chromatography device.

10. The method according to claim 8, comprising the steps of:

equilibrating the chromatography device by utilizing the first pump to transfer wash liquid from the wash source via the first wash chromatography flow path to the chromatography device and at least partly simultaneously priming at least the second pump with feed liquid by engaging the second pump to transfer feed liquid from the feed source to the first waste container via the second feed waste flow path;

transferring feed to the chromatography device by utilizing the second pump to transfer feed liquid from the feed source via the second feed chromatography flow path to the chromatography device and at least partly simultaneously priming at least the first pump with wash liquid by utilizing the first pump to transfer wash liquid from the wash source to the first waste container via the first wash waste flow path;

washing the chromatography device by utilizing the first pump to transfer wash liquid from the wash source via the first wash chromatography flow path to the chromatography device and at least partly simultaneously priming at least the second pump with wash liquid by utilizing the second pump to transfer wash liquid from the wash source to the first waste container via the second wash waste flow path;

continuing washing the chromatography device by utilizing the second pump to transfer wash liquid from the wash source via the second wash chromatography flow path to the chromatography device and at least partly simultaneously priming at least the first pump with eluent liquid by utilizing the first pump to transfer eluent liquid from the eluent source to the first waste container via the first eluent waste flow path;

performing elution in the chromatography device by utilizing the first pump to transfer eluent liquid from the eluent source via the first eluent chromatography flow path to the chromatography device and at least partly simultaneously priming at least the second pump with wash liquid by engaging the second pump to transfer wash liquid from the wash source to the first waste container via the second wash waste flow path;

re-equilibrating the chromatography device by utilizing the second pump to transfer wash liquid from the wash source via the second wash chromatography flow path to the chromatography device and at least partly simultaneously priming at least the first pump with wash liquid by utilizing the first pump to transfer wash liquid from the wash source to the first waste container via the first wash waste flow path.

11. The method according to claim 10, wherein during the step of performing elution, the eluate from the chromatography device is by the lower valve directed to a fraction collector or to the second waste container based on the content of the eluate, which is determined from the signal output from the monitoring unit.

12. The method according to claim 10, wherein the preparative chromatography system comprises an upper monitoring unit arranged in the flow direction to the first waste container, and the upper monitoring unit arranged to analyze the contents in the first waste flow paths and the second waste flow paths, and wherein in the steps of the method, the duration of at least one of the priming operations is determined based on the output of the measuring unit.

13. A preparative chromatography system configured to operate with at least a first process liquid and a second process liquid, the preparative chromatography system comprising at least one chromatography device, a first process liquid source, a second process liquid source, a first upper flow path from the first process liquid source to the chromatography device, a second upper flow path from the second process liquid source to the chromatography device, a first pump positioned in the first upper flow path and arranged to transfer the first process liquid to the chromatography device, and a second pump positioned in the second upper flow path and arranged to transfer the second process liquid to the chromatography device, wherein the first upper flow path is joined with the second upper flow path at a mixing point, the mixing point being downstream of the first and second pump and upstream of the chromatography device, characterized in that the system is configured to prime the first upper flow path with the first process liquid via the first pump, and after the priming, utilizing the first pump to transfer the first process liquid to the chromatography device; and prime the second upper flow path with the second process liquid, via the second pump, and after the priming, utilizing the second pump to transfer the second process liquid to the chromatography device;

wherein the chromatography device is a membrane chromatography device.

14. The preparative chromatography system according to claim 13, wherein the preparative chromatography system is configured to operate with feed liquid, wash liquid and eluent liquid, wherein the preparative chromatography system comprises:

a feed source, a wash source, an eluent source, an upper feed flow path from the feed source to the chromatography device, an upper wash flow path from the wash source to the chromatography device, and an upper eluent flow path from the eluent source to the chromatography device, wherein the preparative chromatography system arranged to operate a pre-phase comprising:

priming the upper feed flow path with feed liquid transferred from the feed source;

priming the upper wash flow path with wash liquid transferred from the wash source; and priming the upper eluent flow path with eluent liquid transferred from the eluent source;

wherein the preparative chromatography system is configured to operate an active preparative phase comprising a process cycle comprising:

equilibrating the chromatography device by transferring wash liquid from the wash source to the chromatography device via the upper wash flow path;

transferring feed liquid to the chromatography device by transferring feed liquid from the wash source to the chromatography device via the upper feed flow path;

washing the chromatography device by transferring wash liquid from the wash source to the chromatography device via the upper wash flow path;

performing elution in the chromatography device by transferring eluent liquid provided from the eluent source to the chromatography device via the upper eluent flow path; and re-equilibrating the chromatography device by transferring wash liquid from the wash source to the chromatography device via the upper wash flow path.

15. The preparative chromatography system according to claim 13, further comprising:

a feed pump provided in the upper feed flow path and configured to transfer the feed liquid to the chromatography device and an upper feed valve positioned downstream of the feed pump in the upper feed flow path, a wash pump positioned in the upper wash flow path and configured to provide the wash liquid to the chromatography device, and an upper wash valve positioned downstream of the wash pump in the wash flow path, an eluent pump positioned in the upper eluent flow path and configured to transfer eluent liquid to the chromatography device, and upper eluent valve positioned downstream of the eluent pump in the eluent flow path;

a monitoring unit positioned downstream of the chromatography device; and a lower valve positioned downstream of the monitoring unit arranged to transfer connection to either a waste container a fraction collector, wherein the preparative chromatography system is configured to operate the pre-phase with the steps of:

priming the upper feed flow path by controlling the feed pump and upper feed valve to transfer feed liquid to the feed flow path, where during this feed priming period the upper wash valve and the upper eluent valve are closed;

priming the upper wash flow path by controlling the wash pump and upper wash valve to transfer wash liquid to the wash flow path, where during this wash priming period the upper feed valve and the upper eluent valve are closed; and priming the upper eluent flow path by controlling the eluent pump and upper eluent valve to transfer eluent liquid to the eluent flow path, where during this eluent priming period the upper wash valve and the upper feed valve are closed; and wherein the preparative chromatography system is configured to operate the active preparative phase comprising a process cycle with the steps of:

equilibrating the chromatography device by controlling the wash pump and upper wash valve to transfer wash liquid to and through the chromatography device, wherein the lower valve is set to the waste container, and during this step the upper feed valve and the upper eluent valve are closed;

transferring feed liquid to the chromatography device by controlling the feed pump and upper feed valve to transfer feed liquid to and through the chromatography device, wherein the lower valve is set to the waste container, and during this step the upper wash valve and the upper eluent valve are closed;

washing the chromatography device by controlling the wash pump and upper wash valve to transfer wash liquid to and through the chromatography device, wherein the lower valve is set to the waste container, and during this step the upper feed valve and the upper eluent valve are closed;

performing elution in the chromatography device by controlling the eluent pump and upper eluent valve to transfer eluent liquid to and through the chromatography device, wherein the lower valve is set to either the waste container or to the fraction collector, the setting depending on the content of eluate detected by the monitoring unit, and during this step the upper wash valve and the upper feed valve are closed; and re-equilibrating the chromatography device by controlling the wash pump and upper wash valve to transfer wash liquid to and through the chromatography device, wherein the lower valve is set to the waste container, and during this step the upper feed valve and the upper eluent valve are closed.

16. The preparative chromatography system according to claim 13, wherein the preparative chromatography system is configured to operate with feed liquid, wash liquid and eluent liquid, and the preparative chromatography system comprises:

a feed source connected to a feed pump, a wash source connected to a wash pump and an eluent source connected to an eluent pump;

a first chromatography device in connection with a first monitoring unit, a second chromatography device in connection with a second monitoring unit and a third chromatography device in connection with a third monitoring unit;

a first upper feed flow path from the feed source to the first chromatography device, a second upper feed flow path from the feed source to the second chromatography device and a third upper feed flow path from the feed source to the third chromatography device, wherein the upper feed flow paths are bifurcated downstream of the feed pump;

a first upper wash flow path from the wash source to the first chromatography device, a second upper wash flow path from the wash source to the second chromatography device and a third upper wash flow path from the wash source to the third chromatography device, wherein the upper wash flow paths are bifurcated downstream of the wash pump;

a first upper eluent flow path from the eluent source to the first chromatography device, a second upper eluent flow path from the eluent source to the second chromatography device and a third upper eluent flow path from the eluent source to the third chromatography device, wherein the upper eluent flow paths are bifurcated downstream of the eluent pump;
wherein the preparative chromatography system is configured to operate an active preparative phase comprising a process cycle comprising:
equilibrating or washing one of the first, second or third chromatography devices with wash liquid transferred from the wash source via one of first upper wash flow paths by the wash pump,
filling another of the first, second or third chromatography devices with feed liquid transferred from the feed source via one of the upper feed flow paths by the feed pump; and
performing elution in the remaining of the first, second or third chromatography devices by transferring eluent liquid from the eluent source via the one of the upper eluent flow path by the eluent pump, wherein the eluate is directed to a waste container or to a fraction collector, depending on the content of eluate detected by the monitoring unit.

17. The preparative chromatography system according to claim 13, wherein the preparative chromatography system is arranged according to:
the feed pump is connected to a first four-way valve, the wash pump is connected to a second four-way valve and the eluent pump is connected to a third four-way valve;
the first four-way valve is connected to a fourth four-way valve, a fifth four-way valve and a sixth four-way valve;
the second four-way valve is connected to the fourth four-way valve, the fifth four-way valve and the sixth four-way valve;
the third four-way valve is connected to the fourth four-way valve, the fifth four-way valve and the sixth four-way valve;
the fourth four-way valve is connected to the first chromatography device;
the fifth four-way valve is connected to the second chromatography device; and
the sixth four-way valve is connected to the third chromatography device,
wherein preparative chromatography system is arranged so that:
feed liquid is provided from the feed source to:
the first chromatography device via the first upper feed flow path by setting the first four-way valve to direct the flow to the fourth four-way valve and setting the fourth four-way valve to direct the flow to the first chromatography device;
the second chromatography device via the second upper feed flow path by setting the first four-way valve to direct the flow to the fifth four-way valve and setting the fifth four-way valve to direct the flow to the second chromatography device; and
the third chromatography device via the third upper feed flow path by setting the first four-way valve to direct the flow to the sixth four-way valve and setting the sixth four-way valve to direct the flow to the third chromatography device,
wash liquid is provided from the wash source to:
the first chromatography device via the first upper wash flow path by setting the second four-way valve to direct the flow to the fourth four-way valve and setting fourth four-way valve to direct the flow to the first chromatography device;
the second chromatography device via the second upper wash flow path by setting the second four-way valve to direct the flow to the fifth four-way valve and setting the fifth four-way valve to direct the flow to the second chromatography device; and
the third chromatography device via the third upper wash flow path by setting the second four-way valve to direct the flow to the sixth four-way valve and setting the sixth four-way valve to direct the flow to the third chromatography device, and
eluent liquid is provided from the eluent source to:
the first chromatography device via the first upper eluent flow path by setting the third four-way valve to direct the flow to the fourth four-way valve and setting the fourth four-way valve to direct the flow to the first chromatography device;
the second chromatography device via the second upper eluent flow path by setting the third four-way valve to direct the flow to the fifth four-way valve and setting the fifth four-way valve to direct the flow to the second chromatography device; and
the third chromatography device via the third upper eluent flow path by setting the third four-way valve to direct the flow to the sixth four-way valve and setting the sixth four-way valve to direct the flow to the third chromatography device.

18. The preparative chromatography system according to claim 13, wherein the preparative chromatography system is configured to operate with feed liquid, wash liquid and eluent liquid, and wherein the preparative chromatography system comprises:
a feed source, a wash source and an eluent source;
a first pump, a second pump, a first waste container and a common valve connected to the chromatography device, wherein the preparative chromatography system comprises:
first chromatography flow paths which pass the first pump from at least one of the process liquid sources to the common valve, and second chromatography flow paths which pass the second pump from at least one of the process liquid sources to the common valve;
first waste flow paths which pass the first pump from at least one of the process liquid sources to the first waste container, and second waste flow paths which pass the second pump from least one of the process liquid sources to the common valve;
wherein, during a process cycle the preparative chromatography system is arranged to while the first pump is utilized in providing a process liquid to the chromatography device, the second pump is at least partly simultaneously utilized in providing a process liquid to the waste container via one of the second waste flow paths.

19. The preparative chromatography system according to claim 13, wherein a predetermined chromatography device sequence defines the order of process liquids that are to be run through the chromatography device, and in one step one of the first pump and the second pump transfers a process liquid to the chromatography device, and least partly simultaneously the other of the first pump and the second pump primes its associated flow path with the process liquid that according to the chromatography device sequence the next process liquid to be transferred to the chromatography device.

20. The preparative chromatography system according claim 13, wherein the preparative chromatography system is configured to operate by executing the steps of:
- equilibrating the chromatography device by utilizing the first pump to transfer wash liquid from the wash source via the first wash chromatography flow path to the chromatography device and at least partly simultaneously priming at least the second pump with feed liquid by utilizing the second pump to transfer feed liquid from the feed source to the first waste container via the second feed waste flow path;
- transferring feed to the chromatography device by utilizing the second pump to transfer feed liquid from the feed source via the second feed chromatography flow path to the chromatography device and at least partly simultaneously priming at least the first pump with wash liquid by engaging the first pump to provide wash liquid from the wash source to the first waste container via the first wash waste flow path;
- washing the chromatography device by utilizing the first pump to transfer wash liquid from the wash source via the first wash chromatography flow path to the chromatography device and at least partly simultaneously priming at least the second pump with wash liquid by engaging the second pump to provide wash liquid from the wash source to the first waste container via the second wash waste flow path;
- continuing washing the chromatography device by utilizing the second pump to transfer wash liquid from the wash source via the second wash chromatography flow path to the chromatography device and at least partly simultaneously priming at least the first pump with eluent liquid by engaging the first pump to provide eluent liquid from the eluent source to the first waste container via the first eluent waste flow path;
- performing elution in the chromatography device by utilizing the first pump to transfer eluent liquid from the eluent source via the first eluent chromatography flow path to the chromatography device and at least partly simultaneously priming at least the second pump with wash liquid by engaging the second pump to provide wash liquid from the wash source to the first waste container via the second wash waste flow path; and
- re-equilibrating the chromatography device by utilizing the second pump to transfer wash liquid from the wash source via the second wash chromatography flow path to the chromatography device and at least partly simultaneously priming at least the first pump with wash liquid by engaging the first pump to provide wash liquid from the wash source to the first waste container via the first wash waste flow path.

21. The preparative chromatography system according to claim 13, wherein during the step of performing elution, the eluate from the chromatography device is by the lower valve directed to a fraction collector or to the second waste container based on the content of the eluate, which is determined from the signal output from the monitoring unit.

22. The preparative chromatography system according to claim 13, wherein the preparative chromatography system comprises an upper monitoring unit positioned prior in the flow direction to the first waste container, and the upper monitoring unit arranged to analyze the contents in the first waste flow paths and the second waste flow paths.

* * * * *